(12) United States Patent
Anthony

(10) Patent No.: US 10,208,735 B1
(45) Date of Patent: Feb. 19, 2019

(54) WIND TURBINE WITH THERMAL BATTERY USING NONCOMBUSTIBLE FUELS FOR STORING REGENERATING ENERGY

(71) Applicant: Michael Mark Anthony, Hohenwald, TN (US)

(72) Inventor: Michael Mark Anthony, Hohenwald, TN (US)

(*) Notice: Subject to any disclaimer, the term of this patent is extended or adjusted under 35 U.S.C. 154(b) by 0 days.

(21) Appl. No.: 15/530,577

(22) Filed: Jan. 31, 2017

Related U.S. Application Data

(63) Continuation-in-part of application No. 14/545,996, filed on Jul. 15, 2015.

(51) Int. Cl.
*F03G 6/06* (2006.01)
*F03D 9/18* (2016.01)
*F28D 20/02* (2006.01)
*F24S 20/40* (2018.01)
*F24S 23/30* (2018.01)
*F03B 3/00* (2006.01)

(52) U.S. Cl.
CPC ............... *F03G 6/06* (2013.01); *F03B 3/00* (2013.01); *F03D 9/18* (2016.05); *F24S 20/40* (2018.05); *F24S 23/30* (2018.05); *F28D 20/02* (2013.01); *F05B 2220/70* (2013.01); *Y02B 10/30* (2013.01); *Y02E 10/74* (2013.01)

(58) Field of Classification Search
CPC ... F03D 3/00; F03D 9/18; Y02B 10/30; Y02E 10/74; Y02P 70/523; F03G 6/06; F28D 20/02; F24J 2/08; F24J 2/0023; F24J 2/32; F05B 2220/70

USPC .............. 60/641.1, 641.8–641.15, 698
See application file for complete search history.

(56) References Cited

U.S. PATENT DOCUMENTS

| | | | | |
|---|---|---|---|---|
| 4,449,515 A | * | 5/1984 | Nilsson, Sr. | F03G 6/067 126/618 |
| 5,384,489 A | * | 1/1995 | Bellac | F22B 1/06 290/44 |
| 6,062,029 A | * | 5/2000 | Doe | F03G 6/065 60/641.15 |
| 8,656,717 B1 | * | 2/2014 | Parker | F24J 2/08 126/642 |
| 2007/0048137 A1 | * | 3/2007 | Hartman | B63H 9/02 416/132 B |

* cited by examiner

*Primary Examiner* — Mark A Laurenzi
*Assistant Examiner* — Wesley G Harris
(74) *Attorney, Agent, or Firm* — Frank L. Kubler

(57) ABSTRACT

A thermal engine includes a thermal battery with a thermal mass for storing regenerative wind and solar energy using a solar lens and mechanical friction generated by the rotation of a wind turbine. The thermal engine comprises a thermal battery; a thermal engine; means of charging the thermal battery using natural energy including a solar lens; a wind turbine; and charging by electrical means. The invention further comprises a means of converting stored thermal energy to mechanical power using non-combustible fluids to drive devices such as an electric generator, a water pump; a means of using said thermal energy to directly heat homes and industrial facilities; a means of using said thermal energy for cooling homes and industrial facilities.

26 Claims, 18 Drawing Sheets

WIND TURBINE WITH THERMAL BATTERY USING NONCOMBUSTIBLE FUELS FOR STORING REGENERATING ENERGY

FILING HISTORY

This Application is a continuation-in-part of application Ser. No. 14/545,996, filed on Jul. 15, 2015, which is a continuation-in-part of application Ser. No. 13/506,943, filed on May 25, 2012, issuing into U.S. Pat. No. 9,500,158, which is continuation-in-part of application Ser. No. 13/506,943 filed on May 25, 2012, which is a continuation-in-part of application Ser. No. 12/380,626, filed on Mar. 2, 2009, issuing into U.S. Pat. No. 8,186,160 on May 29, 2012.

BACKGROUND OF THE INVENTION

1. Field of the Invention

The present invention relates generally to the field of thermal batteries and thermal engines using non-combustible fuels for storing thermal energy and reusing this energy at a later time. The field extends to the use of a charging means for such thermal batteries including wind turbines, solar heating, electrical power and other means for storing reusable thermal energy for later regeneration. More specifically the present invention relates to a thermal battery charging means using either wind power or solar power and a combination of both to charge the thermal battery to store energy that can be used at any time for home heating, home cooling, electrical power generation and other uses. The invention includes a means of converting natural wind energy and natural solar energy to charge a thermal battery for future regeneration of the stored energy. This can be achieved by either solar lens or by mechanical frictional means generated by a wind turbine, and also in combination of both means. The invention provides for a means of generating thermal energy from both solar and mechanical motion; using a single structure that reduces costs of implementation; a means of storing said thermal energy in a thermal battery; a means of converting said stored thermal energy in a thermal mass back into reusable energy that can be used to heat homes, power an engine and for air conditioning and refrigeration purposes. Advantageously the stored thermal energy generated from the apparatus can be used directly for pumping well water, generating electricity, home heating, cooling and other purposes.

A solar lens mounted atop a wind turbine is optimized by geometry to maximize the thermal energy captured at any time by the apparatus. The thermal battery has a thermal mass for storing a maximum amount of thermal energy in the form of direct heat generated by rotational friction, and in combination with solar heating. Without limiting the scope of the invention, however, the preferred mode of charging the thermal battery is to convert wind energy to rotational energy using a conventional wind turbine modified to transmit energy to the thermal mass.

Unlike conventional wind turbines that need to incorporate an electrical generator to generate electrical energy that can be stored in electric batteries the present invention eliminates this need and generates thermal energy by friction generated within a thermal mass using mechanical motion imparted by the wind.

Unlike conventional solar panels that need to incorporate sophisticated electronics to generate electrical energy that can be stored in electric batteries the present invention eliminates this need and generates thermal energy by direct solar heat focused on a thermal mass using a lens to capture sunlight.

The thermal battery is simply a thermal mass consisting of a preferably stainless steel alloys and ceramic composites and alternatively metal alloys and molten salts that have high thermal storage capacity. Advantageously, much more energy can be stored in such a thermal battery than in a conventional electric battery of the same weight since the thermal storage capacity of a metal of the same weight as a regular chemical battery far exceeds the electrical energy storage capacity of the chemical battery. It is in fact the preferred means that Nature has chosen to store energy in the earth, planets, stars, and gravitating bodies.

Advantageously, such a thermal battery can be equipped with an expansion fluid condensation radiator to recapture heat from wasted exhausts fluids. This additionally can increase a negative pressure within a thermal engine during the exhaust cycle to increase the power of the engine.

2. Description of the Prior Art

Wind turbines are generally known to generate power from wind for driving generators and other devices. Such wind turbines generally have generators that convert the mechanical rotation to electrical energy and then store this electrical energy in electric batteries. However, due to the intermittent nature of wind, the energy generated by a wind turbine must be stored in electrical batteries using sophisticated electronics to maximize the capture of wind energy. Generally, a generator coupled to the wind turbine provides for electrical energy generation which can then be stored in a battery pack such as a lithium-ion battery. The intermittent charging of such electric batteries deteriorates them and they become inefficient after several uses and recharges. Further such batteries are expensive, can cause fires, and are extremely toxic in nature. Also the supply of chemicals such as the lithium used to make these electric batteries is in very high and unsustainable demand and the world supply is limited. Also, the rapid growth of demand for uses of such electric batteries by cell phones, and other consumer products will strain the supply and escalate the costs for their use in the regeneration of energy for home and industry. Similar problems beset solar energy capture and regeneration. The solar panels also generate intermittent energy that must be stored in electric batteries such as lithium batteries. The cost of such electric batteries is becoming prohibitive for general home use and the limited supply of the chemicals needed to make these batteries, such as Lithium and cobalt, is a major factor in driving these costs. The decay in efficiency of these batteries is as stated a major factor. This is primarily caused by the uneven energy states of wind and solar. Thus the two systems of natural energy have difficulties when electrical batteries are used for their stored conversion energy. Eliminating the use of electric batteries to store energy for later use from a solar energy and wind turbine can be of importance in our challenge towards reusable energy sources. Present wind energy storage technologies use generators that are driven directly by a wind turbine to generate electricity which can then be stored in electric batteries for later use. Present solar energy storage technologies use solar panels charged by sunlight to generate electricity which can then be stored in electric batteries for later use. The present invention allows the use of a thermal battery to store wind energy and solar energy by the same apparatus in a relatively inexpensive fashion. Advantageously, no electric batteries, generators and expensive energy management systems are required by this invention for the wind turbine itself, and further, no solar panels, electric batteries, and expensive energy management systems are required to capture solar energy. Several uses can be made of the thermal heat stored and regenerated as useful energy from a thermal battery. Further, a thermal battery can be recharged and heated intermittently without deterioration and can last a very long time with minimal maintenance. For this process the wind and solar energy are translated to thermal energy directly by means of friction and solar lenses to heat the thermal battery without an intermediate electric storage stage.

Further, the intermittent nature of wind energy requires regulators to be used when converting such energies to electrical energy for storage in electric batteries. Multiple charge times for electric batteries results in hysteresis and inefficient operation and eventually the rapid deterioration of the batteries. This intermittency can be accommodated by the present invention by storing the heat generated from friction and solar energy at any rotation speed of a wind turbine and at any intensity of sunlight.

A growing concern about the disposal of chemically based electrical batteries and the efficient global transformation of new technologies to replace existing polluting technologies has emerged. What is needed is a policy which adopts a philosophy of replacing or assisting existing technologies such as fossil fuel, combustion engines and electric batteries for storing power over a period of time that can be used at a later time when needed. Such an apparatus as described by the present invention which uses thermally generated power from wind power and solar power in a closed or open thermodynamic cycle to generate heat, cooling and mechanical power without pollution.

It is thus an object of the present invention to provide an apparatus which uses wind power to generate frictional energy to thermally store heat energy in a thermal battery for later use.

It is an objective of the present invention to use non-combustible expansion fluids to generate useful power from a thermal battery to drive a thermal engine.

It is an objective of this invention to use wind power to rotate the blades of a wind turbine and to transmit mechanical motion to a thermal mass to generate frictional heat that can be stored in a thermal mass for later use.

It is another object of the present invention to provide an apparatus that uses wind energy to charge frictional heat into a thermal mass to store said frictional heat energy for later use.

It is another object of the present invention to provide an apparatus that uses a solar lens to capture heat and store said heat in a thermal battery for later use.

It is another object of the present invention to provide an apparatus that uses a combination of both wind energy and solar energy in conjunction with a thermal battery to store heat energy for later use.

It is still another object of the present invention to provide an apparatus that uses frictional heat from the rotation of a turbine shaft to store said wind energy in a thermal mass to generate pressure by causing expansion fluid such as water to expand from a liquid state to a vapor state to power a thermal engine, whereof, a liquid such as water is injected into the thermal mass of the thermal engine to generate pressurized gases as expanded fluid to generate mechanical power from wind.

It is a further objective of the present invention to disclose an apparatus having a wind turbine with a thermal engine that is powered by a thermal battery by means of a phase change in an expansion fluid from a liquid phase to a vapor phase to pump water.

It is yet another objective of the invention to use a wind turbine in combination with a solar lens to generate thermal energy and store said thermal energy in a thermal battery and then convert said stored thermal energy to mechanical energy using a thermal engine to drive an electric generator.

It is yet another objective of the invention to use a wind turbine in combination with a solar lens to generate thermal energy and store said thermal energy in a thermal battery and then convert said stored thermal energy to mechanical energy using a thermal engine to drive an electric generator.

It is yet another objective of the invention to use a wind turbine in combination with a solar lens to generate thermal energy and store said thermal energy in a thermal battery and then convert said stored thermal energy to mechanical energy using a thermal engine to drive a water pump.

It is a further objective of the present invention to disclose a wind turbine with a solar lens and a thermal engine that has no toxic chemicals for storing energy, and, causes no pollution.

It is a further objective of the present invention to disclose a wind turbine with a thermal battery that can be recharged when required by means of electric thermal heating means over a period of time to store energy in a thermal battery for later uses.

It is a further objective of the present invention to disclose a solar charged thermal battery to store energy for later uses.

It is a further objective of the present invention to disclose a wind turbine with a thermal engine and a thermal battery that can be used to power conventional evaporative cooling for home and industrial uses.

Advantageously, unlike electric batteries whose potential deteriorates with the number of charges, the thermal battery can be recharged with heat a large number of times without reducing its capacity to store heat energy, and without deterioration. Further, the thermal battery is environmentally safe and can be recycled to manufacture new items by recycling its material without any consequences to the environment. Further, the exhaust of the thermal engine using a thermal battery can be pure steam.

SUMMARY OF THE INVENTION

The present invention accomplishes the above-stated objectives, as well as others, as may be determined by a fair reading and interpretation of the entire specification.

For the purposes of describing the invention, the words "wind turbine", "wind mill", "wind generators", "regenerative wind turbine", "regenerative wind mill", and "windmill", shall be considered to be the same.

The present invention relates generally to the field of thermal engines and thermal batteries for storage and regeneration of wind energy using wind turbines. More specifically the present invention relates to a wind turbine charging means for a thermal battery, for powering thermal engines, water pumps, refrigerators, and for heating and cooling.

In a first embodiment of the invention, the apparatus includes a thermal battery for storing heat including a thermal mass within a vacuum case. A means of charging the thermal battery with thermal energy stored in the thermal mass is provided including a wind turbine with a solar lens incorporated to generate mechanical energy and solar energy from wind and from sunlight respectively. The wind turbine comprises turbine blades which respond to wind currents by rotating. At the same time, a solar lens incorporated at the top of the wind turbine is used to collect solar energy. The rotation of such turbines is generally uncontrolled since it depends on the variable motion of wind. Thus conventional wind turbines have many gears and controls to regulate high speed rotation rates that can occur. The present invention does not need all these complications. The rotation of the turbine blades is transmitted by a horizontal turbine shaft to drive a vertical turbine shaft directly without limiting or controlling the speed. A dynamic friction rod which can also be a friction rod attached to the end of a vertical shaft is used to generate frictional heat against a static friction rod. The static friction rod is embedded within a thermal mass of the thermal battery and when the turbine blades rotate, the motion is translated by bevel gears to rotate the vertical shaft and then rotate the dynamic friction rod against a static friction rod to generate frictional heat between said static friction rod and said dynamic friction rod. Incorporating a solar lens on the top of the apparatus allows the vertical shaft to act as a thermal mass that transmits motion and solar energy to the thermal mass directly. Thus by the same means, the wind energy and the solar energy is transmitted to the thermal battery. The thermal energy thus generated is stored in a thermal mass for later use for one of, heating, powering a thermal engine to drive either an electrical generator or a pump, an evaporative cooling system, and for powering a compressor for air-conditioning.

Advantageously, the wind turbine can be of conventional design such as having turbine blades that rotate with the flow of wind currents. However, no generator is needed to capture the mechanical energy.

The apparatus consists of a horizontal shaft housed in a horizontal casing to support a horizontal shaft with bearings. Turbine blades attached to the horizontal shaft allow the wind currents to rotate the horizontal shaft. The motion of the horizontal shaft is coupled to a bevel gear to mesh with and transmit power to another perpendicular bevel gear attached to the top end of the vertical shaft. A vertical casing holds the vertical shaft on bearings to freely rotate therein. The motion is transmitted from the horizontal shaft to the vertical shaft to drive a dynamic friction rod embedded in a thermal mass of a thermal battery. The relative rotation of the dynamic friction rod against the static friction rod generates heat that is stored in the thermal mass. A solar lens on the top of the horizontal casing is focused on the top end of the vertical rod to transmit solar energy directly to the vertical shaft. The heat collected from sunlight by the solar lens is transmitted to the thermal mass by the vertical shaft and then to the dynamic friction rod attached at its bottom end. Thus the thermal mass is heated by both frication and solar energy. The heat stored in the thermal mass can then be used at a later time to generate mechanical power using a thermal engine such as described by the present inventor in U.S. Pat. No. 8,186,160, and U.S. Pat. No. 9,500,158 B1.

In its most basic form, the first embodiment of the invention includes a thermal battery and a thermal battery charging means including a wind turbine assembly which comprises a horizontal casing with a dome solar lens; a horizontal shaft; a vertical shaft; a pair of bevel gear; a dynamic friction rod attached to the vertical shaft; a static friction rod attached to a thermal battery. The invention further comprises a thermal engine for converting thermal energy to mechanical motion.

The horizontal turbine casing is constructed from rigid and light materials such as fiber glass, aluminum, or composite ceramics. The horizontal turbine casing rotatably attaches to a journal bearing on the vertical casing to allow the turbine blades to be oriented to the maximum flow of wind. The vertical casing supports the horizontal casing and thus serves to be a pedestal for the apparatus to stand tall. The vertical casing also houses a vertical shaft on bearings for transmitting rotational energy in a vertical axis to the thermal battery. The end of the vertical casing has a vertical casing flange that attaches to a thermal battery with bolts. The horizontal casing has dome-like solar lens at the top pointing skyward. The central axis of the solar lens is centered on the axis of the vertical shaft. The horizontal shaft projects from the horizontal casing to connect to a symmetric and dynamically balanced set of turbine blades that are used to collect the energy from the motion of wind. The horizontal shaft is supported by horizontal casing bearings within the horizontal casing to support the horizontal shaft and allow it to rotate freely. The horizontal casing is attached rotatably and perpendicularly on the top of the vertical casing. The vertical casing has a vertical casing flange at its base to couple mechanically with bolts to a vacuum case that forms the shell of the thermal battery. The thermal battery can form a structural support and foundational base of the apparatus. The vertical casing serves to hold the vertical shaft which must be strong and a very good heat conductor for focused sun rays collected by the solar lens atop to transmit heat to a thermal mass. The solar lens is shaped like a dome and is oriented to point skyward and collect sunlight and focus it on the top end of the vertical shaft. Preferably, the vertical casing is preferably a double walled tube with reflective internal walls between which is a vacuum chamber to reduce conductive heat losses from within the vertical casing. Preferably, the internal walls of the vertical casing are made highly reflective to prevent radiation heat loss. Insulation may also be used to fill the gap between the walls of the vertical casing and the vertical shaft. The focused sunlight is channeled through the solar lens to impinge upon the vertical shaft end and transmit heat to the thermal battery. The vertical shaft end could be designed to be ball-ended to collect solar light from the solar lens at any angle.

The rotation of the horizontal shaft is coupled to a bevel gear that meshes to a perpendicular bevel gear attached to the end of the vertical shaft to translate the rotation of the horizontal shaft to the vertical shaft. In some cases, the rotation of the horizontal shaft can be used to directly drive a dynamic friction rod without the need for such gears. In such the case, the thermal battery is mounted directly in the horizontal casing and the horizontal shaft is used to drive the dynamic friction rod at its other end. Obviously, the rotation of the horizontal shaft can be translated to a vertical shaft which can be held by vertical shaft bearings within a vertical casing to freely rotate therein when the horizontal shaft rotates. For the purposes of this invention, either a vertical shaft or a direct horizontal shaft drive can be used to drive a dynamic friction rod.

The vertical casing also has vertical shaft bearings to allow the vertical shaft to rotate freely therein. Preferably, the vertical shaft bearings should be able to withstand very high temperatures. These bearings could for example be made from ceramic materials and composites such as Graphite alloys. Depending on the maximum operating temperature of the apparatus, the vertical shaft should be made from an excellent thermal conductor such as aluminum and copper and other alloys. The vertical shaft can also be made hollow and then filled with waxes that have good thermal storage capacities for heat storage and transmission.

The bottom end of the vertical casing is flanged with bolt holes that can be attached to a vertical shaft access port through the vacuum case having similar bolt holes. Thus when assembled, the thermal battery itself can act as a foundation pedestal strong enough to hold the entire apparatus.

The thermal battery has a vacuum case that surrounds a thermal mass and encases the thermal mass in a vacuum. Appropriate insulation such as ceramic fibers, blankets and other materials such as ceramic fire bricks can be used to insulate the thermal battery from heat losses. The thermal battery can act as a structural base to hold the wind turbine assembly in position. The vertical casing should be insulated from the thermal battery by a suitable insulating gasket such as a ceramic gasket. The insulating gasket should be thick enough to prevent heat loss to the vertical casing from the thermal battery. A vertical shaft access hole on the vacuum case with bolt holes similar to bolt holes on the vertical shaft flange is provided to accept the vertical shaft flange and to allow the vertical shaft to project into a thermal battery hole into the thermal mass. When the vertical casing flange is bolted to the vacuum case with the insulating gasket in place, the vertical shaft projects about midway into the thermal battery hole. The vertical shaft should freely rotate within the thermal mass hole. Preferably, the thermal battery is constructed with an outer shell that forms a vacuum case within which is encapsulated the thermal mass. Both the thermal mass and the vacuum case can be constructed from metals such as stainless steel in the form of cylinders or rectangular boxes. The thermal mass is preferably a block of high thermal storage materials such as cast iron, stainless steel or suitable graphite and composite alloys. The shape of the thermal mass should closely match the shape of the vacuum case and preferably the two can be cylindrical, spherical or some other suitable shape that minimizes the surface area per unit volume of material. The thermal mass is made from suitable high heat capacity materials is preferably made from alloys of stainless steel, but can also be pure metals such as tungsten, cobalt, and titanium. Graphite may also be used if weight is of concern. The thermal mass has a weight that is calculated to achieve the desired thermal energy storage capacity required and thus must be suitable for the energy generation capacity of the wind turbine. Examples of the heat storage density of some materials are shown in the table below:

| Material | Heat storage density kJ/m3 oC | Operating temperature range, oC. |
| --- | --- | --- |
| Aluminum | 2484 | 680 |
| Cast Iron, Stainless Steel, | 3889 | 1151 |
| Ceramics | 2800 | 2000 |
| Taconite | 2500 | 2000 |
| Saltstream ™ 565 | 1960 | 565 |

Thus, a material with high thermal storage capacity accords the least volume of the thermal mass. The end of the vertical shaft terminates on a welded dynamic friction rod flange. The dynamic friction rod flange is designed to bolt to a cylindrical dynamic friction rod at the end of the vertical shaft. The dynamic friction rod is preferably mechanically coupled to make intimate thermal contact with the vertical shaft to maximize heat transmission between the vertical shaft and the dynamic friction rod. This constitutes the wind turbine assembly. The vertical shaft projects from the vertical casing so that when the vertical casing flange is bolted to the vacuum case through the bolt holes in the thermal battery with the insulating gasket in place, the dynamic friction rod projects inside a thermal battery hole through the thermal mass to about midway inside the thermal battery hole.

The thermal battery hole through the thermal mass is center on the vertical shaft axis. A static friction rod made from materials with high friction capacity is passed through the thermal battery hole to mate intimately with the dynamic friction rod. A compression spring is placed behind the static friction rod to push it against the dynamic friction rod. It is important that the static friction rod be surrounded by and be in intimate contact with the thermal battery hole.

The dynamic friction rod can be attached to the dynamic friction rod flange by recessed bolts and countersinking the dynamic friction rod, so that it can be removed and replaced when the need arises. However, it can also be designed with a meshing surface to mate with matching meshing surface on the dynamic friction rod. A heavy compression spring is inserted behind the static friction rod to push it against the dynamic friction rod to make intimate thermal contact. A thermal battery hole cover plate with matching bolt holes is then bolted to the open end of the vacuum case to lock the assembly in place.

Preferably, the thermal battery is a cylindrical shape however many shapes and forms can be adapted without limiting the invention. The vacuum case that surrounds the thermal mass must have a vacuum cavity between the thermal mass and the vacuum case to maintain a vacuum around the thermal mass. Ceramic spacers could be used to prevent direct contact between the vacuum case and the thermal mass. A vertical shaft port passes through the vacuum case directly aligned with a thermal battery hole to allow the vertical shaft to pass through the vacuum case into the thermal battery hole. The vertical shaft port has bolt holes around the vertical shaft port that should match the vertical casing flange bolt holes and thermal battery bolt holes. To maintain vacuum, a vacuum insulator spacer made from a suitable insulator such as ceramic is provided with matching bolt holes to the thermal mass bolt holes serves to seal the periphery of the thermal mass hole. The vacuum insulator spacer is placed between the vacuum case and the thermal mass to seal the vertical shaft and the thermal battery hole to prevent vacuum loss from the vacuum cavity through the vertical casing.

To maintain the vacuum, a vacuum insulator spacer is also provided between the vacuum case and the thermal battery hole cover plate. The thermal battery hole cover plate is bolted to the static friction rod so that the static friction rod cannot rotate relative to the thermal mass. The static friction rod has an area that is large enough for the dynamic friction rod to freely rotate against its end to allow thermal transmission fluids such as mixtures of ferrous materials and silicon to fill the empty spaces inside the thermal mass hole. The focused solar rays can heat up the vertical shaft to transmit heat to the thermal mass. Thus the static friction rod should be in intimate thermal contact with the walls of the thermal battery hole and should be able to transmit heat efficiently to the thermal mass. The dynamic friction rod rotates against the static friction rod and thermally heat up the thermal mass by friction.

As such the static friction rod should be made from a suitable material such as wollastonite (calcium silicate), copper alloys, stainless steel alloys, abrasives, asbestos, vermiculite (hydrated calcium aluminum silicate), mica (aluminum silicate), basalt fiber, rockwool, (blast furnace slag or basalt), Fiberfrax@ ceramic fiber, polyacrylonitrile (PAN), polyester, chopped glass fiber, and aramid fibers. When the static friction rod is compressed against the dynamic friction rod to make intimate contact using the compression spring, dynamic friction rod sits against the static friction rod inside thermal mass battery hole and can rotate freely against the static friction rod when the vertical shaft rotates. This makes for easy removal of the static friction rod and the dynamic friction rod for maintenance.

In yet another embodiment of the present invention, the dynamic friction rod can be made as a series of dynamic friction vanes that directly slide frictionally against the thermal mass hole inside the thermal mass. This allows dissipation of friction heat from the dynamic friction vanes directly into the thermal mass without a need for the static friction rod. In such a case, the static friction rod is not necessary and could be removed to allow the dynamic friction vanes to freely rotate frictionally against the thermal mass hole. A copper heat dissipation and wear sleeve could be incorporated to tightly fit inside the thermal mass hole to avoid wear of the thermal mass. The apparatus can store heat from wind or solar energy.

Advantageously, as the dynamic friction rod rotates against the static friction rod, heat is generated between them and transmitted through the static friction rod to within the thermal mass. It is important that the static friction rod be made from a highly conductive and friction generating material as mentioned earlier. Stainless steel, copper and titanium alloys may also be used for low power application since a continuous low power charging of the thermal mass can still occur over time. In some cases, a Ferro-silicon fluid can be used to fill up empty spaces in the thermal battery hole to generate additional frictional heat by rotating dynamic friction rod therein and to absorb the heat from the solar rays that has been transmitted to and through the vertical shaft. Sand, salts and other alumina silicates mixed with some thermal waxes may also be used to fill the thermal battery hole free spaces to generate as much added friction as possible and heat distribution as possible.

The vacuum case surrounds the thermal mass. The thermal mass is preferably made from a suitable metal with high heat storage capacity such as stainless steel. A vacuum pulled between the thermal mass and the vacuum case allows adequate thermal insulation from conduction of heat from the thermal mass to the environment. Radiation insulators such as aerogels and ceramic blankets including reflective plates could also be used inside and outside of the vacuum case and between the vertical casing and the vertical shaft to further prevent radiation heat loss from the thermal battery.

Advantageously, the vertical shaft itself acts as a thermal mass that increases the heat storage capacity of the thermal battery.

An expansion fluid intake pipe is provided to sealingly enter into the thermal mass through the vacuum case. An expansion fluid intake valve connects to the expansion fluid intake pipe to control the amount of expansion fluid that enters the thermal battery. A source of an expansion fluid preferably water from a suitable mains supply can be used to supply expansion fluid to the expansion fluid intake valve. The expansion fluid intake pipe connects sealingly to expansion fluid passageways interspersed throughout the thermal mass for adequate removal of heat from all regions of the thermal mass. Preferably the thermal mass is a cast block of metal that has the expansion fluid passageways built in. This can be achieved by means of overcasting metal on pipes of similar materials that form the expansion fluid passageways. The expansion fluid passageways are designed to bring in expansion fluid through the walls of the thermal battery and fluidly and sealingly circulate expansion fluid through the thermal mass to create a thermodynamic phase change of the expansion fluid and generate a gas as an expanded fluid therefrom. The output of the expanded fluid passageways also sealingly passes through the vacuum case to exit therefrom and bring expanded fluid to the outside of the thermal battery.

The first method of operation and use of the apparatus is as follows. When the vertical shaft rotates, it generates heat between the static friction rod and the dynamic friction rod to heat up the thermal mass. Solar heat focused by the solar lens is collected by the vertical shaft and also transmitted by the vertical shaft to the thermal mass. The heat is stored in the thermal mass and when the expansion fluid intake valve is open, expansion fluid passes through the thermal mass, and heats up rapidly. Hot expansion fluid is expanded to expanded fluid that generates high pressures. The expanded fluid can then be used for heating, and to power an absorption refrigerator, and other uses such as in manufacturing.

The second method of operation and use of the apparatus is as follows. As long as there has been enough solar energy and wind energy stored in the thermal mass as heat, when the vertical shaft rotates, it generates heat between the static friction rod and the dynamic friction rod to heat up the thermal mass. The heat is stored in the thermal mass and when the expansion fluid intake valve opens, expansion fluid passes through the thermal mass to generate hot expanded fluid by a phase change. The expanded fluid is used for powering a thermal engine with a generator attached. Thermal engines powered by thermal batteries are described in patents issued to the present inventor.

In a second embodiment of the present invention, a thermal engine is provided with the turbine assembly and thermal battery mentioned above. The thermal engine includes an epitrochoid thermal engine casing within which is a rotor slidably and sealingly retained to form three distinct rotating variable volume chambers between the thermal engine casing and the rotor. The thermal engine has three chambers that comprise at any one time an intake chamber, a primary exhaust chamber, and a secondary exhaust, chamber. The rotor is triangular in shape similar to a conventional Wankel engine but differs by not having a compression chamber, or spark plugs. It also has four distinct fluid ports. Internal planetary gears are rigidly attached to a large bore through the rotor's central axis of symmetry cause motion of the rotor to follow a crankshaft with a crank lobe that hold a sun gear that meshes with the planetary gear. The crank lobes pass through the center of the planetary gear. The thermal engine casing covers are provided with seals and bearings through which the crank shaft journal rides to rotate freely and form a drive shaft for powering devices. Several assemblies of the above assembly can be stacked together with a multi-lobed crankshaft to form a multi-rotor thermal engine.

The thermal engine casing has a generally smooth and continuous oval-like epitrochoid internal surface with no sharp edges. The rotor is preferably triangular in shape with faces that form profile of the intersection of three large cylindrical faces with centers at the points of a triangle that is typically 4-5 times the size of the rotor peripheral edge circle. Similar to a conventional rotary engine, the rotor has three edges with groves that are designed to hold what are generally referred to in the industry as apex seals. The apex seals are used to form a fluid seal between the rotor edges and the internal face of the thermal engine casing so that at any one time only three chambers comprising of an intake chamber and a primary exhaust chamber and secondary exhaust chamber are formed. The rotor also has groves along the edges of the walls to hold edge seals for sealing the rotor against the faces of the thermal engine housing covers. The rotor is smaller than the thermal engine casing and can ride around the thermal engine housing interior wall so that at one time during its motion, the three corner apex seals of the rotor will be in intimate sealing contact the internal surface of the rotor housing to form the three closed chambers. As the rotor rotates around the thermal engine casing, the contact points for variable volumes for the intake chamber, the primary exhaust chamber and the secondary exhaust chamber are formed at all times. The integrity of these chambers depends on the efficiency of the apex seals and the edge seals between the rotor and the thermal engine casing and thermal engine casing covers. The thermal engine casing has cooling ports passages around its peripheral wall to allow for cooling fluids to pass through, to cool the thermal engine.

The thermal engine of this invention uses a crank shaft lobe with cylindrical bearing shaft portions that have an axis that is eccentrically offset from the crankshaft drive axis. In reference to the thermal engine casing, when the center point of the crank shaft lobe lines up with longest axis of the epitrochoid thermal engine casing, the crank shaft lobes will be considered to be at the 0° angular position of the crankshaft. In the present invention, the thermal engine consists of four fluid ports that enter into the epitrochoid thermal engine casing, comprising one intake port through the side walls of the epitrochoid thermal engine casing positioned approximately at 315° angle from the 0° angular position of the crankshaft. The crankshaft lobes are considered to be at "Intake dead center" when they are aligned with an Intake port at 315°. The thermal engine also has a primary exhaust port through the epitrochoid thermal engine casing positioned approximately at a 45° angle from the 0° of the crankshaft, a secondary exhaust port positioned at 90° angle from the 0° of the crankshaft, and a tertiary exhaust port positioned at 215° angle from 0° position of the crankshaft respectively. Thus at any moment, there are always three active chambers and four ports on the thermal engine. The intake port is offset from the tertiary exhaust port by about 90°. Other angular offsets may be used between the ports to optimize the flow of expanded fluid through the thermal engine. The epitrochoid thermal engine casing has bolt holes for bolting thermal engine casing covers on either face and to form a closed thermal engine with sealed chambers. The thermal engine casing covers has bearing supports to hold the crankshaft rotatably and to allow the drive shaft of the crankshaft to protrude through them and power devises through epitrochoid thermal engine casing covers.

The thermal engine can be used with any thermal battery for powering devices. To operate the apparatus, either electric power, wind power or solar power may be used to charge the thermal battery with heat. However, in the preferred embodiment of the invention, wind energy is used to rotate the horizontal shaft to generate frictional heat from the rotational friction between a static friction rod and a dynamic friction rod. This heat is stored within the thermal mass as explained earlier. A solar lens also heats up the vertical shaft to transmit heat to the thermal mass through the vertical shaft. The thermal mass heats up to temperatures that far exceeds the boiling temperature of the expansion fluid so that expanded fluid can be obtained therefrom. To regenerate the thermal energy and use it to generate heating, mechanical or electric power, the expansion fluid supply valve is opened. Expansion fluid passes through the thermal battery passageways and expands by phase change to expanded fluid such as steam. The amount of expanded fluid generated and thus the temperature depends on the final thermal temperature and thermal characteristics of the thermal mass. Pressure generated by the thermal battery can be varied by regulating the flow rate of expansion fluid using a supply valve such as a needle valve. The expansion fluid such as water is passed through the thermal battery expansion passageways to circulate therein to uniformly heat and expand from a liquid phase to an expanded fluid in the vapor form. Thus the expanded fluid such as steam can be passed into the intake port of the thermal engine to generate mechanical power. The expansion of most expanded fluid such as steam for example, cannot completely occur during the intake chamber expansion phase.

When expanded fluid enters the intake port, it expands and causes the rotor to rotate. This expands the intake chamber. Thus advantageously, there are three exhaust ports that are tied together to a main exhaust line from two exhaust chambers namely the primary exhaust chamber and the secondary exhaust chamber. The engine rotates clockwise an increasing angular orientation from the vertical axis of the epitrochoid thermal engine casing.

During a single cycle of the thermal engine, an intake chamber is formed as an "active chamber" by isolating the intake port from all the other ports with two apex seals. For the purposes of clarity, the two particular apex seals have a common face on the rotor that will form an isolated intake chamber with epitrochoid thermal engine casing as an "active chamber". The rotation of the two seals takes the active chamber through a cycle of the engine. There are thus three active chambers in a clockwise sequence, a present active chamber, a past active chamber and a future active chamber that are in sequential rotation around the epitrochoid thermal engine casing. At the start of a cycle, the intake port is fluidly isolated from the exhaust ports by the location of two apex seals forming a present active chamber. We will only deal with the present active chamber as it rotates around the engine.

The intake port is never in fluid communication with the primary exhaust port or the secondary exhaust port. When the present active chamber isolates the intake port, the intake port has expanded fluid pressure. The future active chamber is in fluid communication with only the tertiary exhaust port. The past active chamber is in fluid communication with both the primary exhaust port and the secondary exhaust port.

The pressure in the present active chamber causes the rotor to rotate in a clockwise manner causing all the active chambers to rotate. Following the present active chamber, the expanding active chamber maximizes in volume, rotates the rotor, closes fluid communication from the intake port and opens fluid communication with the primary exhaust port to contract and exhaust expanded fluid through the primary exhaust port. The primary exhaust port is momentary isolated by the present active chamber. As the present active chamber minimizes, (the typical compression stroke of a Wankel engine), the secondary exhaust port comes in fluid communication with the present active chamber while the present active chamber is still fluidly connected to the primary exhaust port. Thus the secondary exhaust port opens and assists the primary exhaust port in the removal of expanded fluid from the present active chamber. While the present active chamber is minimizing both the primary exhaust port, and the secondary exhaust port have positive flow of expanded flow into the main exhaust line. Past the minimum volume both the primary exhaust port and the secondary exhaust port have negative flow of expanded flow from the main exhaust line. At some point, the present active chamber cuts of fluid communication with the primary exhaust port and only has fluid communication with the secondary exhaust port. Thus as it expands, it pulls expanded fluid from the main exhaust through the secondary exhaust port. Expanded exhaust fluid from the main exhaust line then enters the secondary exhaust port to fill the present active chamber as it expands. The present active chamber maximizes and then cuts off fluid communication with the secondary exhaust port and is now in fluid communication with only the tertiary exhaust port which is in fluid communication with the main exhaust line. Thus the present active chamber minimizes in volume by expelling expanded fluid to the main exhaust line through the tertiary exhaust port only.

As the present active chamber minimizes and rotates, it comes into fluid communication with the intake port while still in fluid communication with the tertiary exhaust port. The extra fluid pressure is generated in the main exhaust line from the intake port flow through the tertiary exhaust to the main exhaust line. This pressure must now be annihilated by removing expanded fluid from the main exhaust line to enter through the secondary exhaust port. However as the present active chamber minimizes, the future active chamber has now entered into fluid communication with the secondary exhaust port which also has rotated with the present active chamber in tandem. Thus when the present active chamber is minimizing, the future active chamber that follows is maximizing in fluid communication with the secondary exhaust port. The future active chamber now pulls exhausted expanded fluid through the secondary exhaust port from the main exhaust line that is exactly equal to the amount being taken into the present active chamber through the intake port to exit through the tertiary exhaust port into the main exhaust line.

The present intake chamber rotates and cuts off the tertiary exhaust port and completes a cycle by isolating the intake port to start a new cycle to form an intake chamber. Note that while the present active chamber forms an intake chamber to restart the cycle, the future active chamber is in communication with the tertiary exhaust port, replacing the present active chamber's prior position. The past active chamber is in fluid communication with the primary exhaust port and the secondary exhaust port. The pressure wave of the cycles of the thermal engine can be regulated by adding a pressure oscillator such as a diaphragm oscillator held in a closed chamber to accommodate the pressure cycles. Thus such a pressure oscillator can act to oscillate an induction coil around a stationary magnet to generate electricity by induction. Similarly such a pressure oscillator can act to oscillate a diaphragm in a chamber to force water in and out of the oscillator through a one way valve to act similar to a diaphragm pump. The pressure oscillator can serve should be in fluid communication with the secondary exhaust port and to some extent to the main exhaust line to absorb and dispose of positive and negative pressure oscillations of the expanded fluid through the second exhaust port. The pressure oscillator will absorb and release pressure from the secondary exhaust port in a periodic manner forming pressure waves or a resonant acoustic waves. Advantageously if the acoustic waves are properly timed to generate a resonance, the pressure oscillator will become a resonator that amplifies the pressure cycle to maximize the pressure of the intake port and minimize the pressure of the main exhaust line increasing the power of the thermal engine.

Advantageously, the intake port and the exhaust ports should be shaped as slits with appropriate area to minimize the time during which the apex seals pass over them. The intake port is fluidly connected to receive expanded fluid from the thermal battery. The primary exhaust port can be tied to be in fluid communication with the main exhaust line at a substantially large pipe section to freely carry expanded fluid without hindrance. The secondary exhaust port should be tied to both the pressure oscillator and the main exhaust line to resonate. The tertiary exhaust line should be tied to the main exhaust line. The main exhaust line could be open to atmosphere, but may also be tied to a radiator for heating. The exhausted expanded fluid can be recycled by providing a radiator through which expanded fluid can flow from the main exhaust line to cool to condense into hot expansion fluid that can be reused or used for home or industrial heating purposes.

If water is used as expansion fluid, water can be supplied to the cooling ports of the thermal engine directly from the same source as the expanded fluid source and the thermal engine can be air-cooled directly by expelling heat to atmosphere.

The third method of operation and use of the apparatus is as follows. A wind turbine with the thermal battery is provided according to the description in the first embodiment. The rotation of the vertical shaft of the apparatus generates heat between the static friction rod and the dynamic friction rod to heat up the thermal mass. As stated earlier, the dynamic friction rod could be replaced by a dynamic friction vane and in such an event, the static friction rod could be removed. A solar lens is provided to focus sunlight on the vertical shaft which also acts as a thermal mass. The heat is stored in the vertical shaft and transmitted to the thermal mass When enough heat is stored in the thermal mass, when the expansion fluid intake valve is opened, an expansion fluid passes through the thermal mass and hot expansion expanded fluid is created that can be used for powering an absorption refrigerator of conventional design. An absorption refrigerator uses a heat source such as waste factory heat, solar heat, and fueled flames to provide the energy needed to drive a cooling process. The absorption cooling cycle comprises a evaporation phase, an absorption phase and a regeneration phase. A liquid refrigerant is evaporated in a low partial pressure environment to extract heat from its surroundings. The low partial pressure results in a low temperature of evaporation of the refrigerant. The refrigerant is absorbed by another liquid such as water with a salt preferably an ammonium salt, dissolved therein. When the resulting refrigerant in solution is heated by the thermal mass, refrigerant-saturated liquid is heated and the refrigerant evaporates out of solution. A heat exchanger cools the gaseous refrigerant to remove the heat to ambient air. This condenses the refrigerant to start the cycle again.

DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE INVENTION

Figure 1:
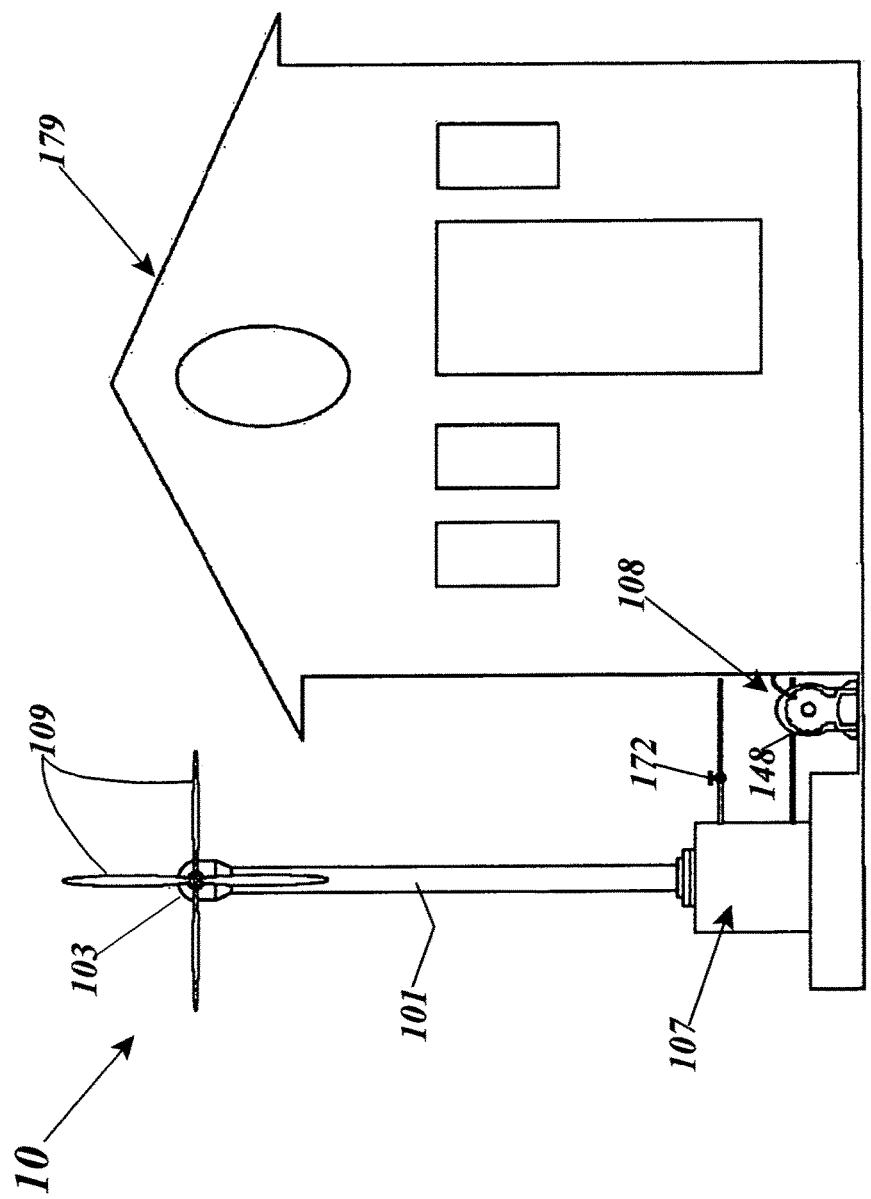
FIG. 1 shows a home equipped with a wind turbine with frictional thermal charging means to charge a thermal battery for use with a thermal engine running a generator.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

The present invention accomplishes the above-stated objectives, as well as others, as may be determined by a fair reading and interpretation of the entire specification. The present invention relates generally to the field of thermal engine and thermal batteries for storage and regeneration of wind energy using wind turbines.

Figure 2:
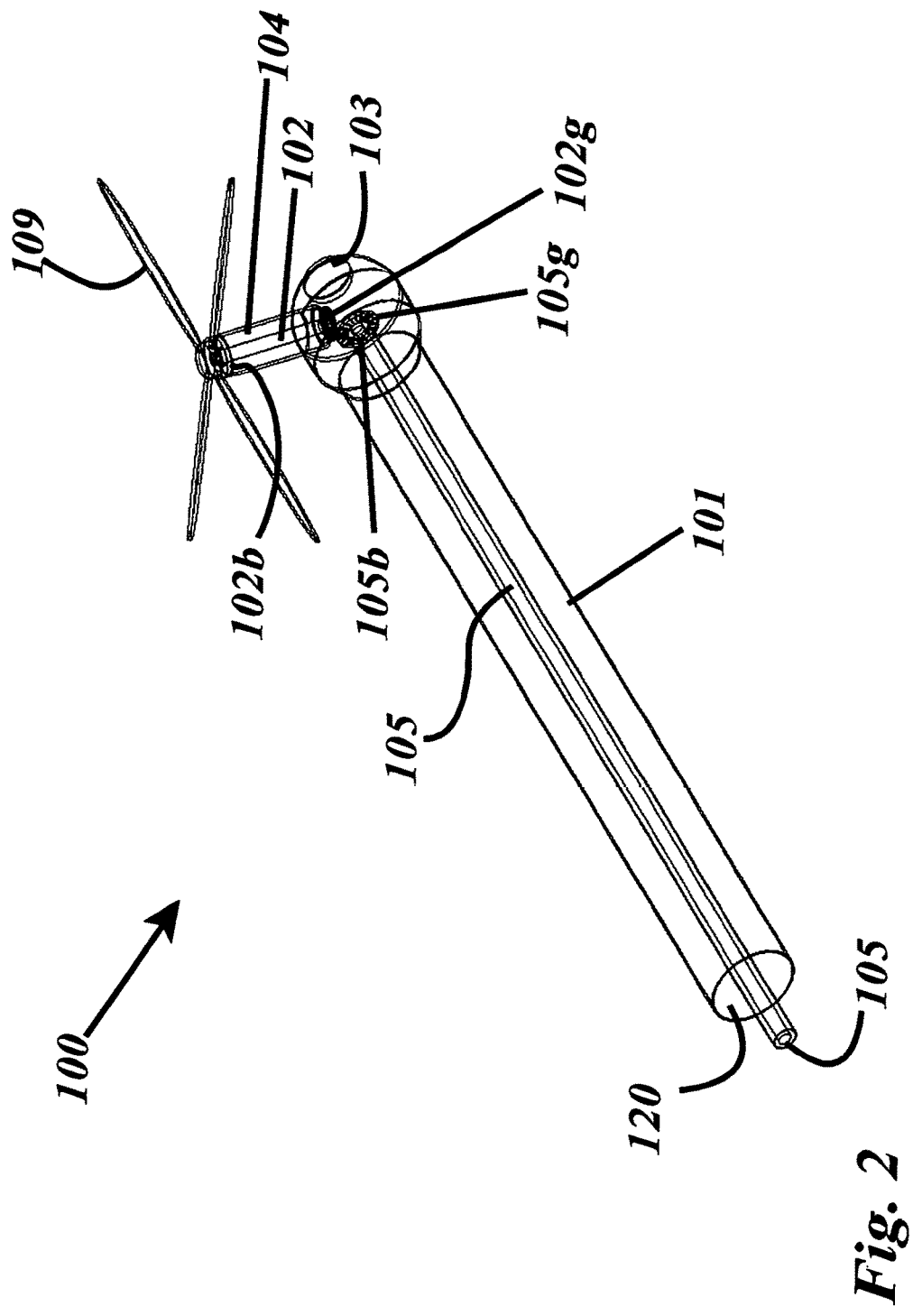
FIG. 2 shows a transparent view of a wind turbine assembly according to the embodiments of this invention, with the horizontal casing, horizontal shaft, horizontal shaft bearings, including bevel gears, the vertical shaft, vertical casing flange and the vertical casing and a domed solar lens.
Figure 3:
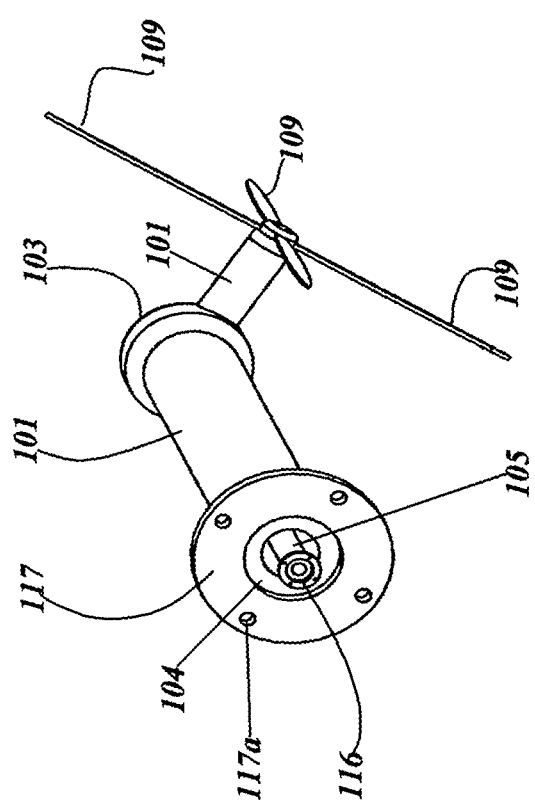
FIG. 3 shows a slanted view of the wind turbine with the vertical casing, the horizontal casing, the vertical casing flange and the dynamic friction rod flange, including turbine blades, and a domed solar lens.
Figure 4:
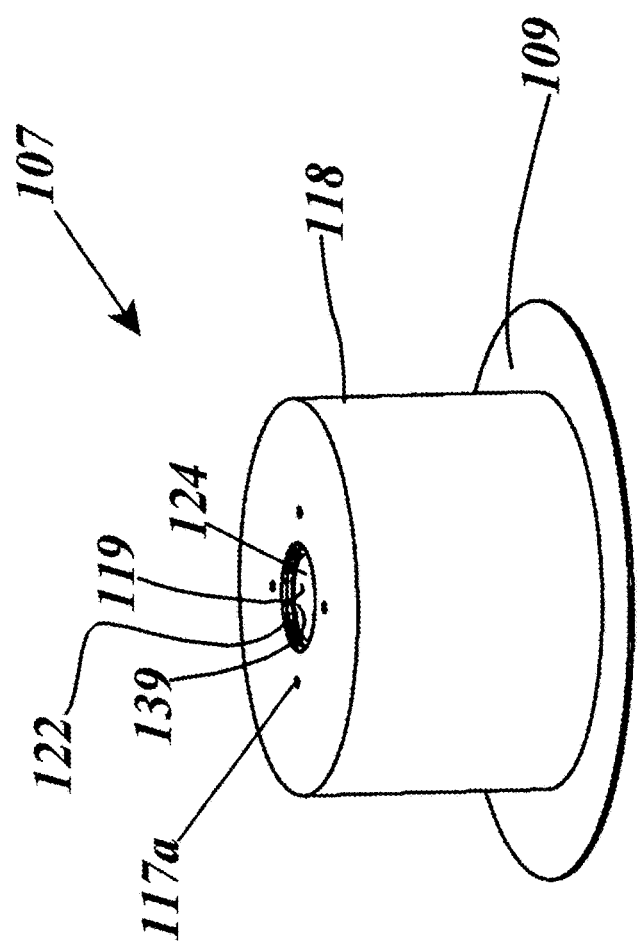
FIG. 4 shows the thermal battery with the vacuum case and the vertical shaft access port with the bolt holes for attaching the vertical casing.
Figure 5:
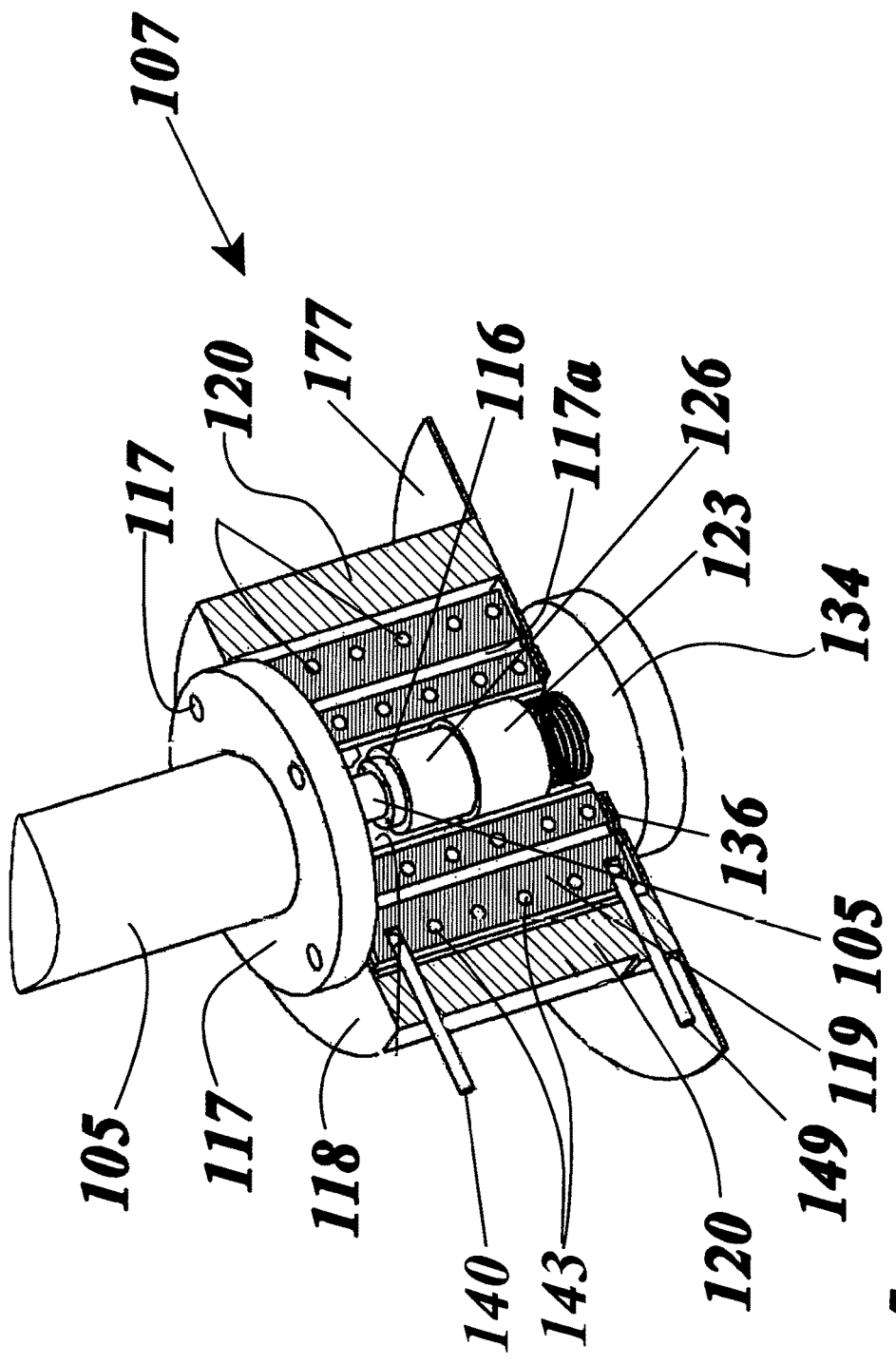
FIG. 5 shows a cross sectional view of the thermal battery with the vertical casing flange attached to the vertical shaft port through the vacuum case; the vacuum cavity, inside the vacuum cavity; the thermal mass with the thermal mass passageways, including the thermal battery hole within which is shown the static friction rod and the dynamic friction are in intimate contact with the compression spring in place.
Figure 6:
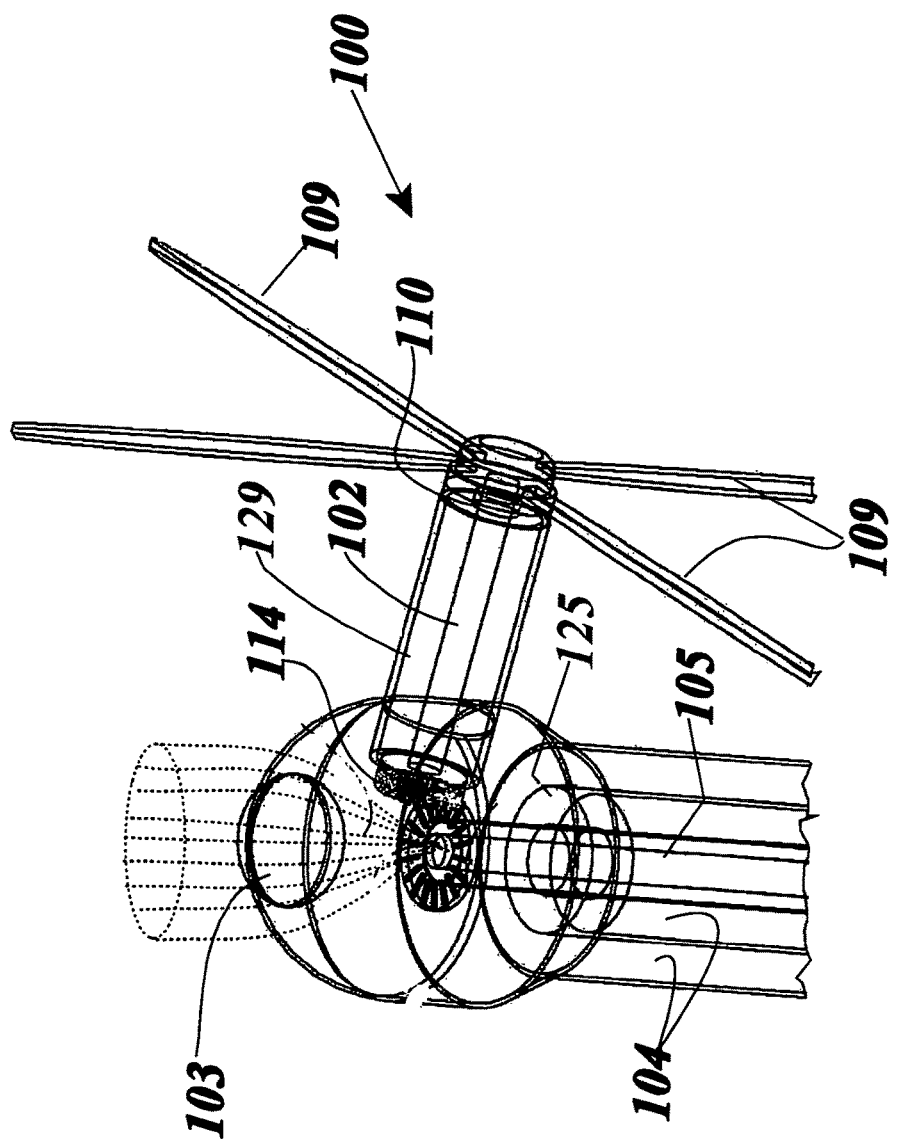
FIG. 6 shows a transparent view of the solar lens, the horizontal casing with the horizontal shaft therein held by bearing, and bevel gears for a right angle rotation translation, from the horizontal shaft to the vertical shaft. The slora rays are schematically shown focused on the top of the vertical shaft.
Figure 7:
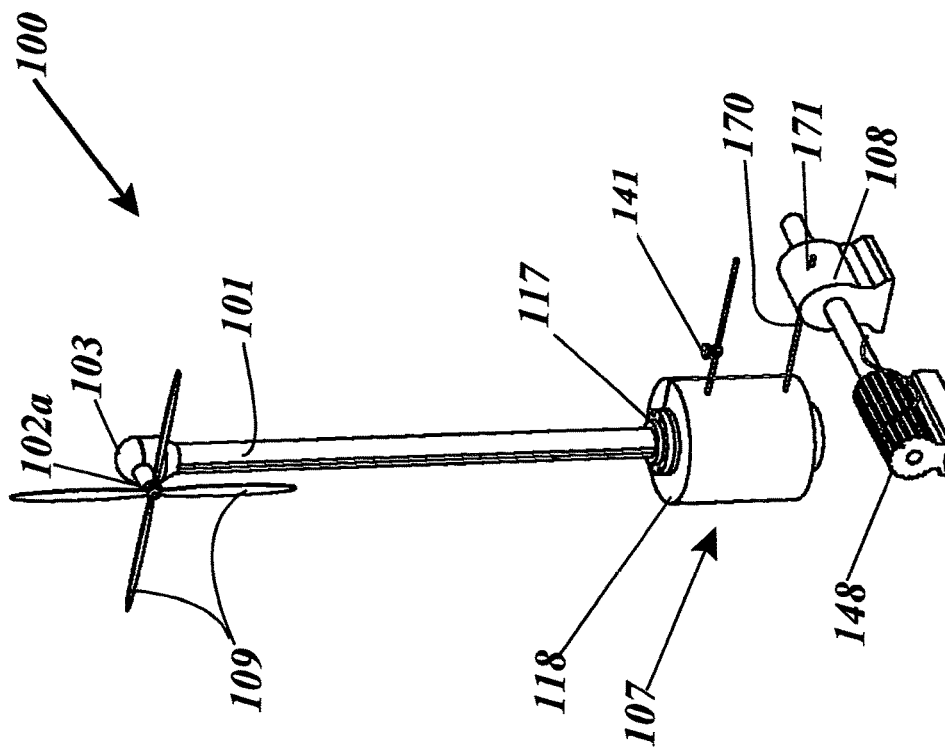
FIG. 7 shows the apparatus of the invention with a wind turbine assembly the thermal battery, the thermal engine and a generator.
Figure 8:
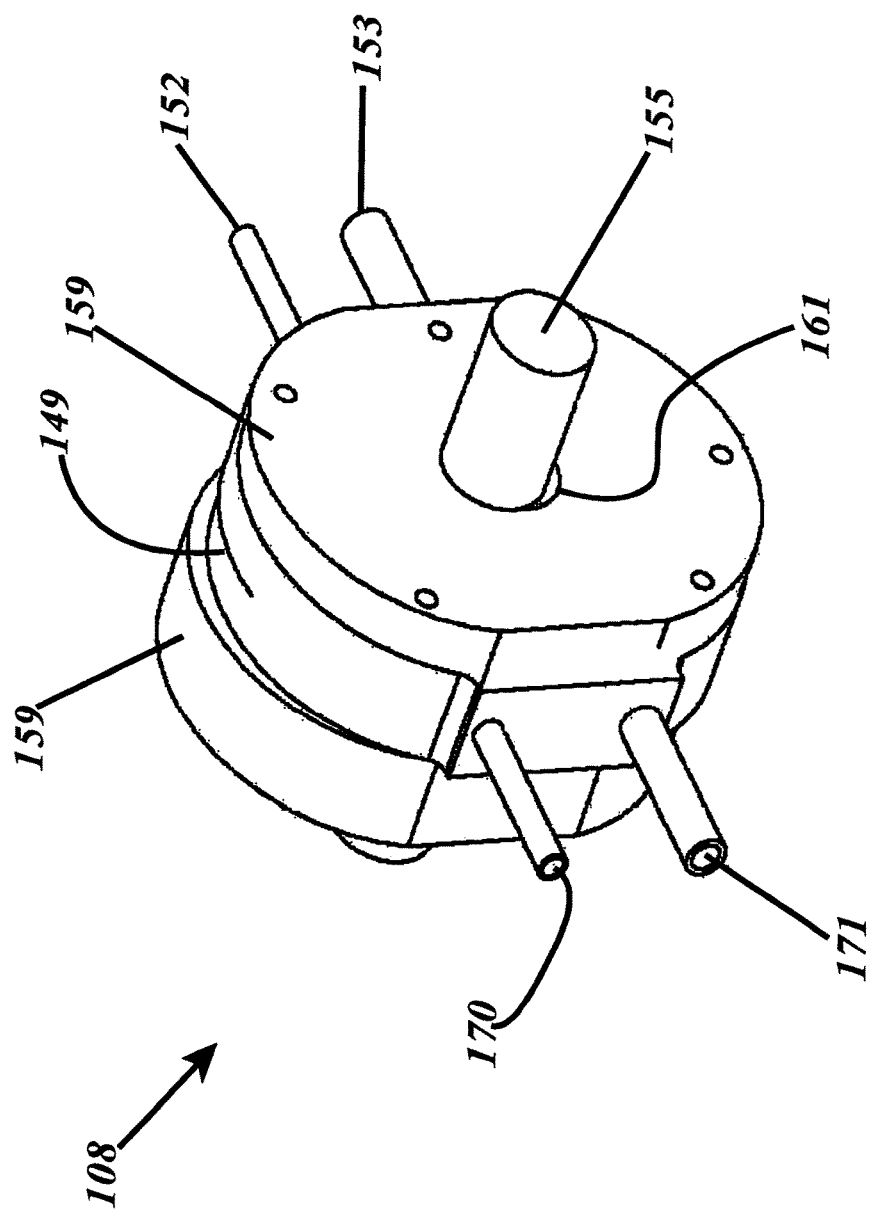
FIG. 8 show the thermal engine according to the present invention with the intake port, the primary exhaust port, the secondary exhaust port, and the tertiary exhaust port attached to the epitrochoid thermal engine casing.
Figure 9:
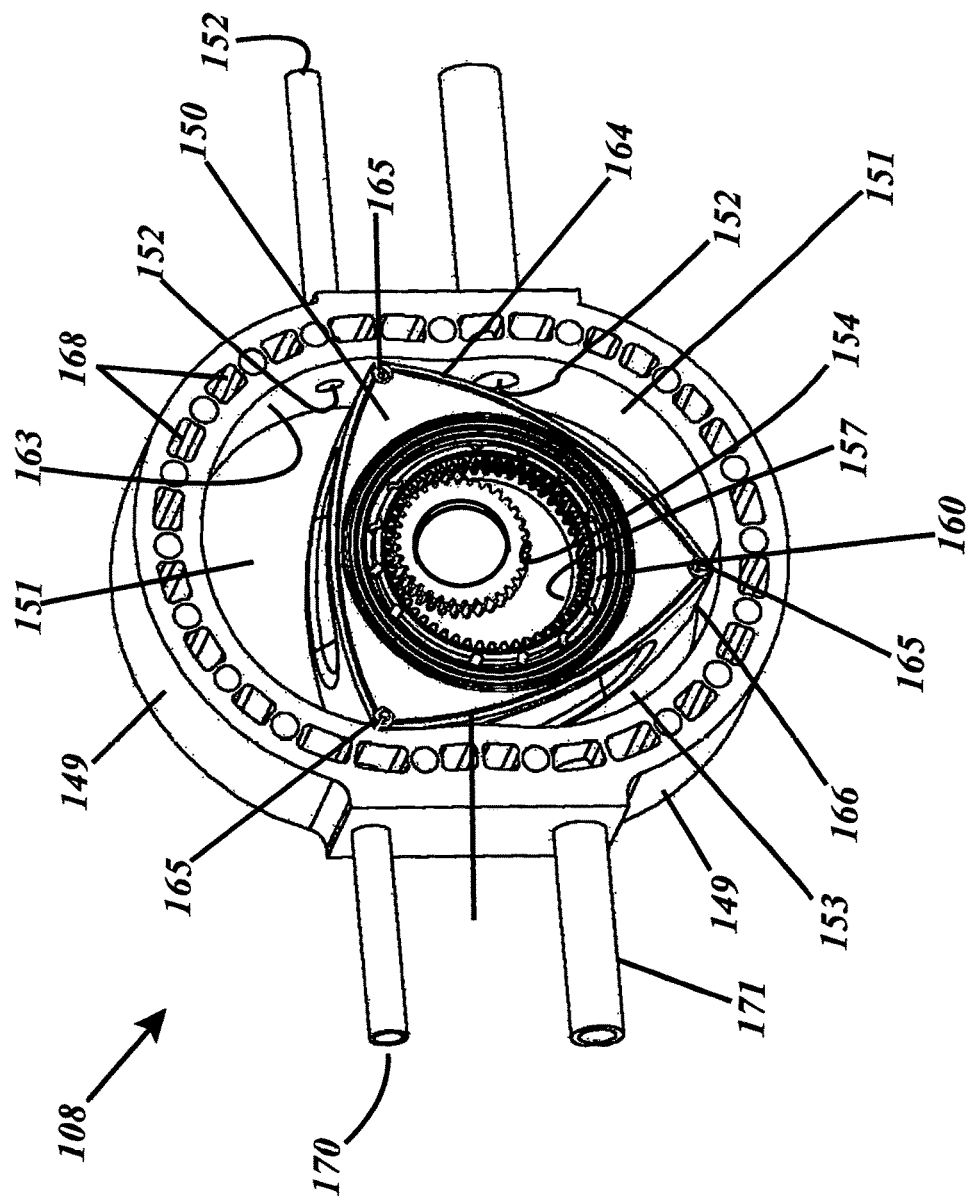
FIG. 9 shows the thermal engine without the epitrochoid thermal engine casing covers. The rotor is shown inside the epitrochoid thermal engine casing, with the apex seals and the engine seals in place.
Figure 10:
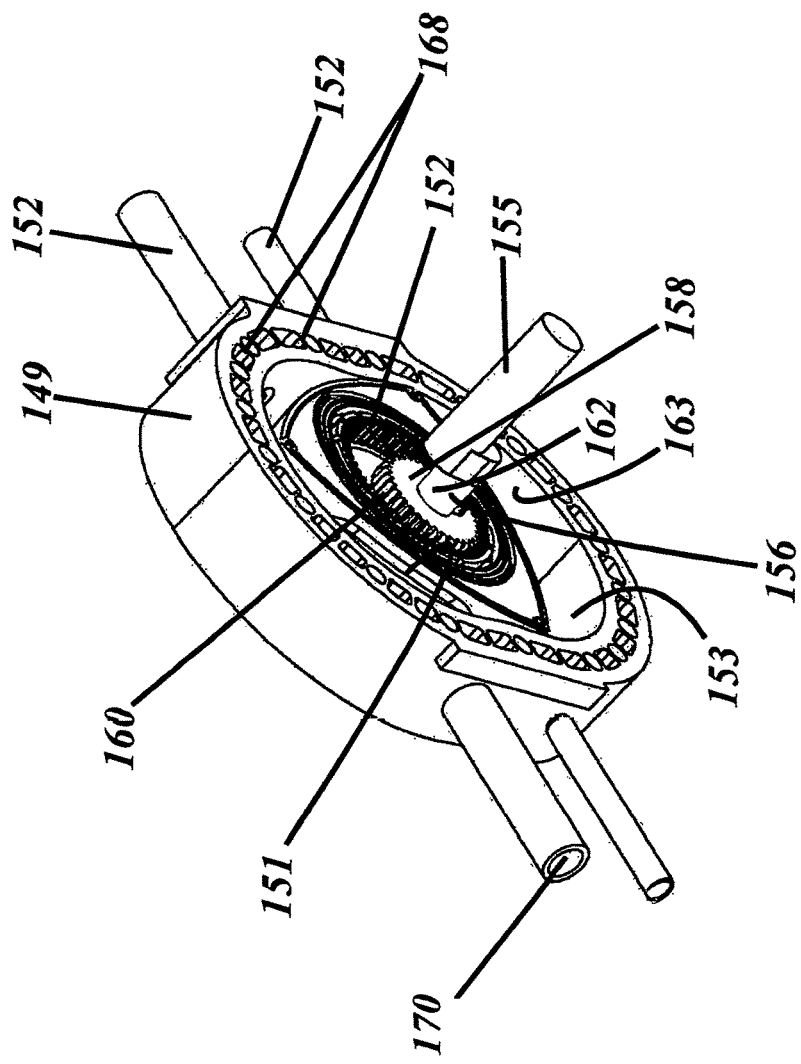
FIG. 10 shows the thermal engine without the epitrochoid thermal engine casing covers. The rotor is shown inside the epitrochoid thermal engine casing, with the apex seals and the engine seals in place and a crankshaft passing through the rotor journal bearing. The sun gear on the rotor and the planet gear are shown in relation to one another and the rotor.
Figure 11:
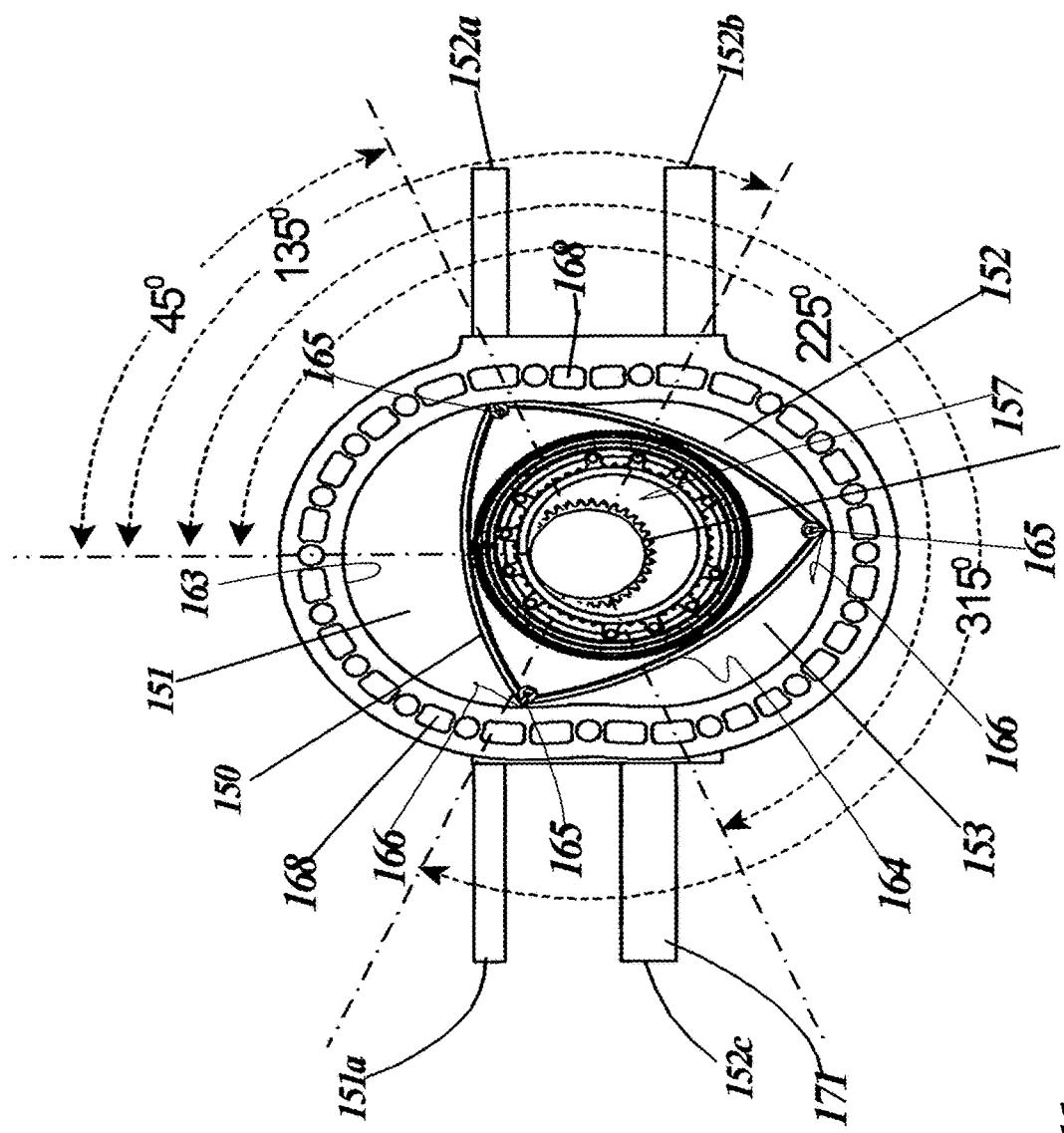
FIG. 11 shows the thermal engine without the epitrochoid thermal engine casing covers. The rotor is shown inside the epitrochoid thermal engine casing, with the apex seals and the engine seals in place and a crankshaft passing through the rotor journal bearing. The sun gear on the rotor and the planet gear are shown in relation to one another and the rotor. The diagram shows the angular orientation of the intake port, the primary exhaust port, the secondary exhaust port and the tertiary exhaust port.
Figure 12:
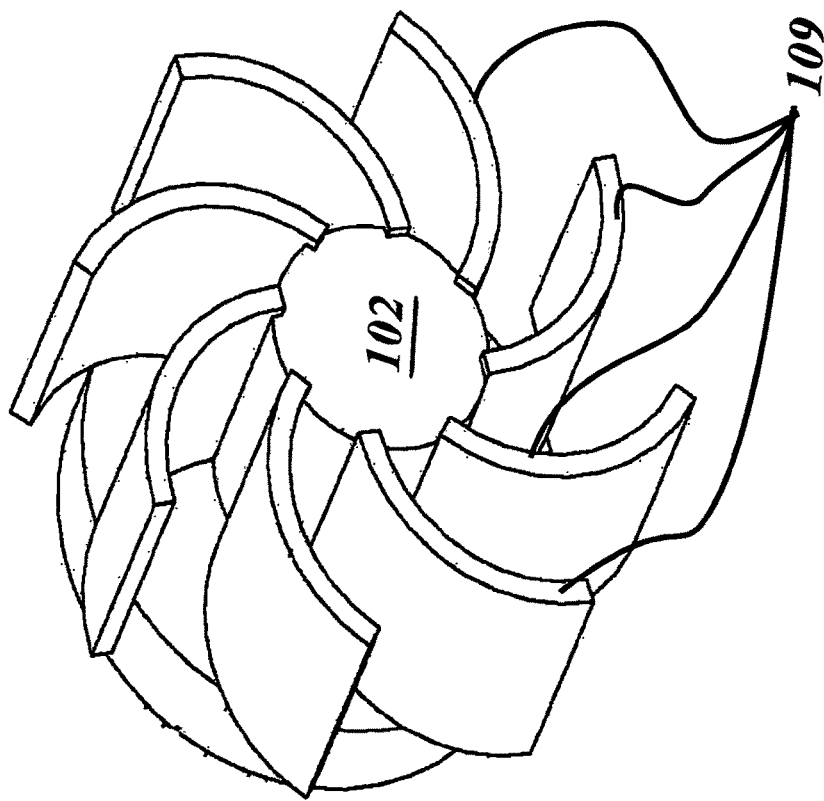
FIG. 12 shows the dynamic friction vane with the dynamic friction vane coupler.
Figure 13:
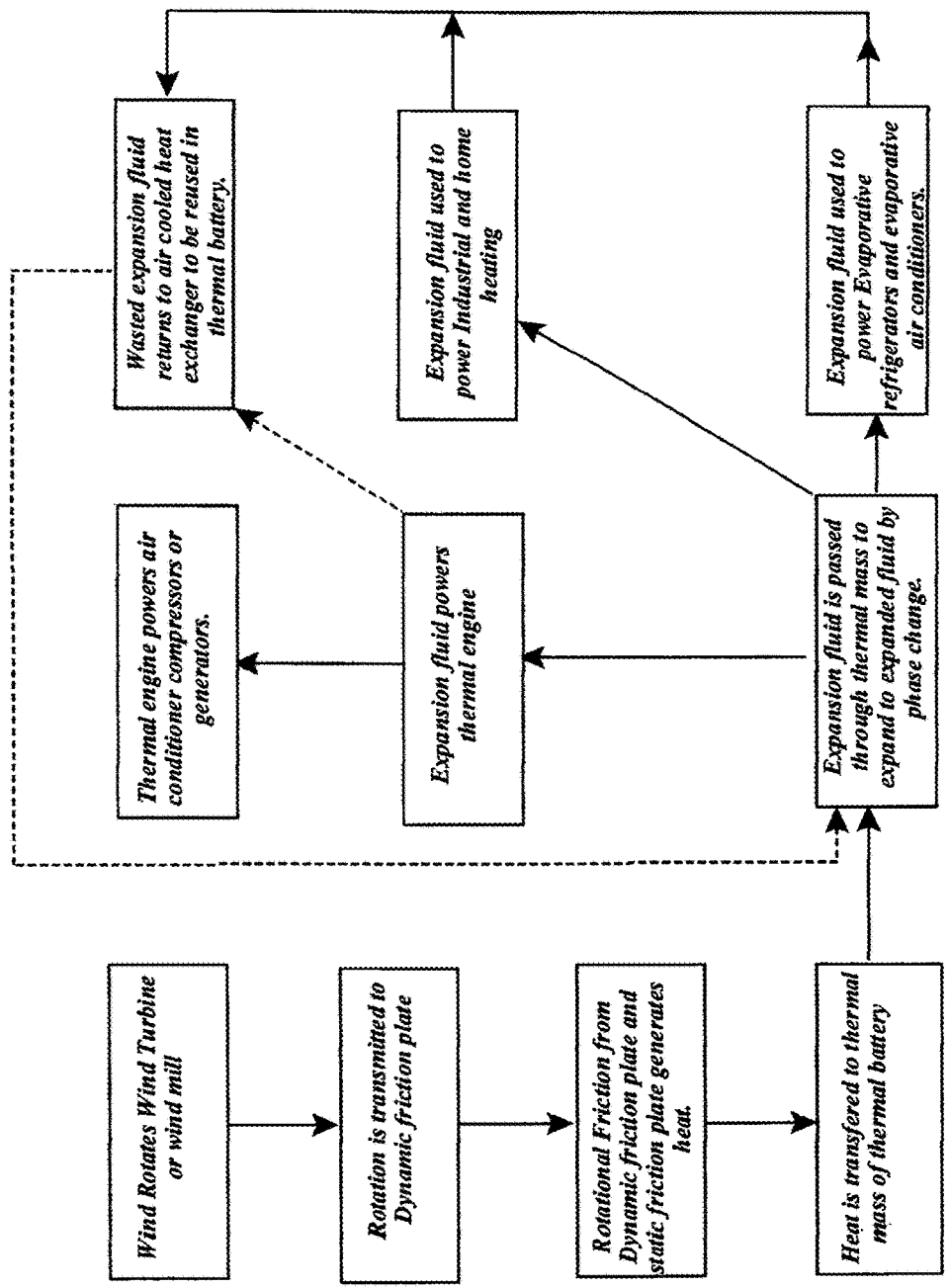
FIG. 13 shows a flow chart of the operations involving the thermal battery being charged with thermal energy by a wind turbine according to the embodiments discussed.
Figure 14:
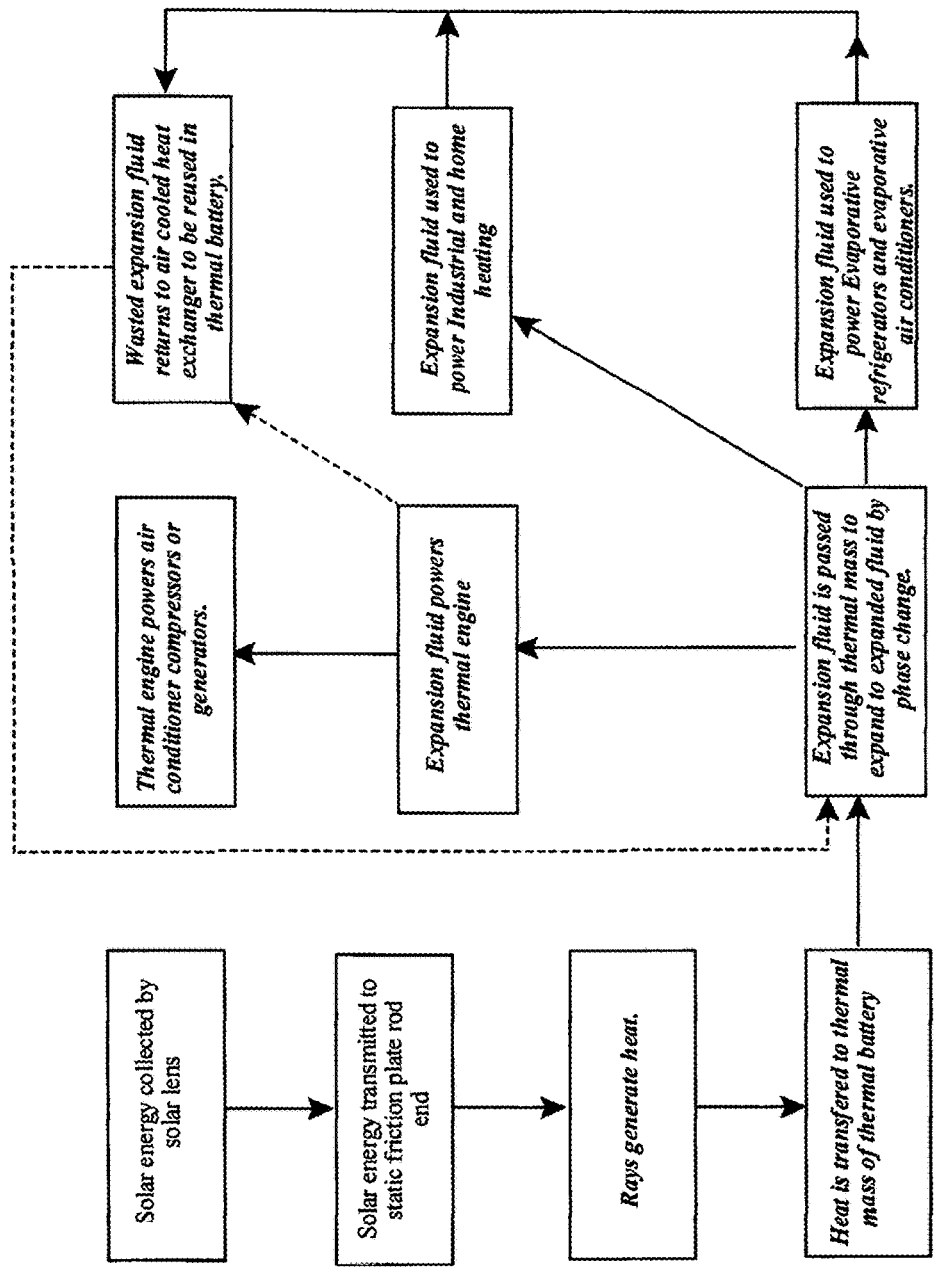
FIG. 14 shows a flow chart of the operations involving the thermal battery being charged with thermal energy by a solar lens according to the embodiments discussed.
Figure 15:
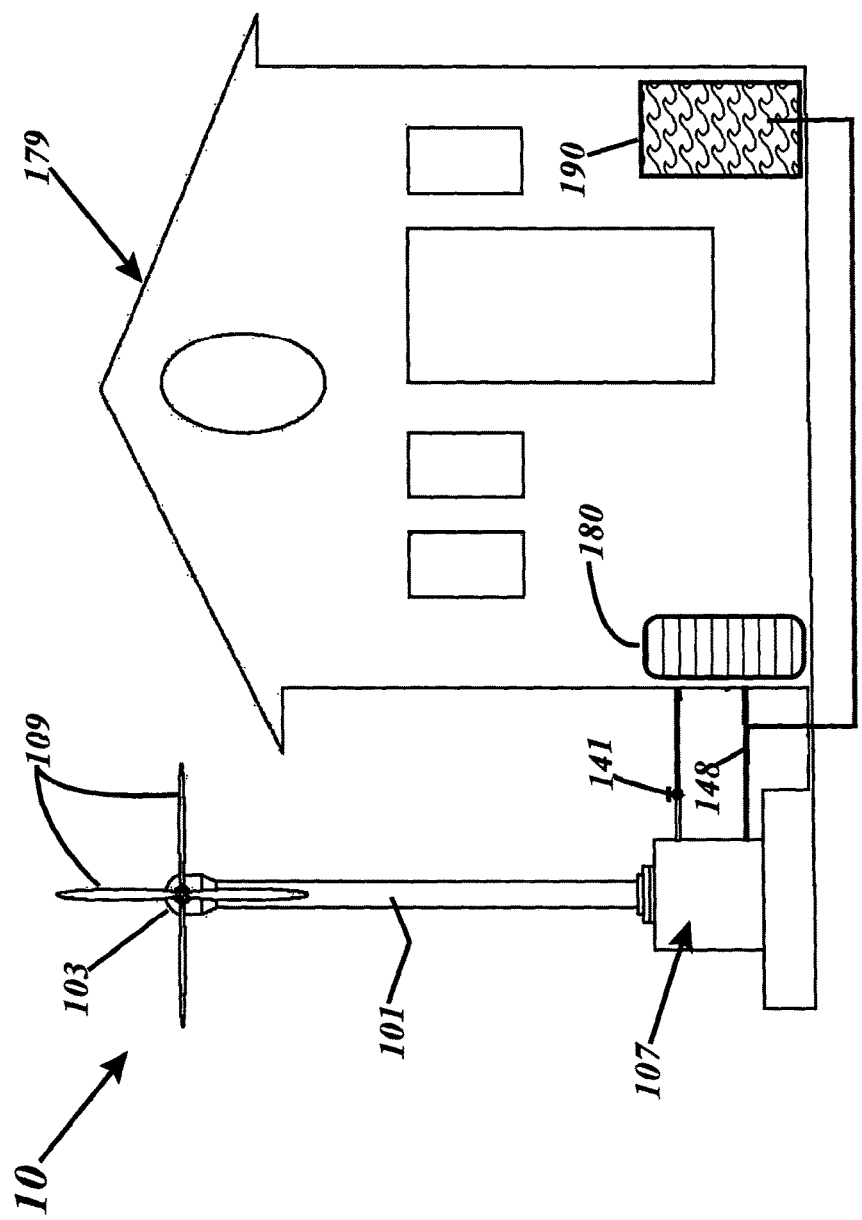
FIG. 15 shows the present invention in use for home heating and cooling using a radiator and an evaporative cooling refrigerator.
Figure 16:
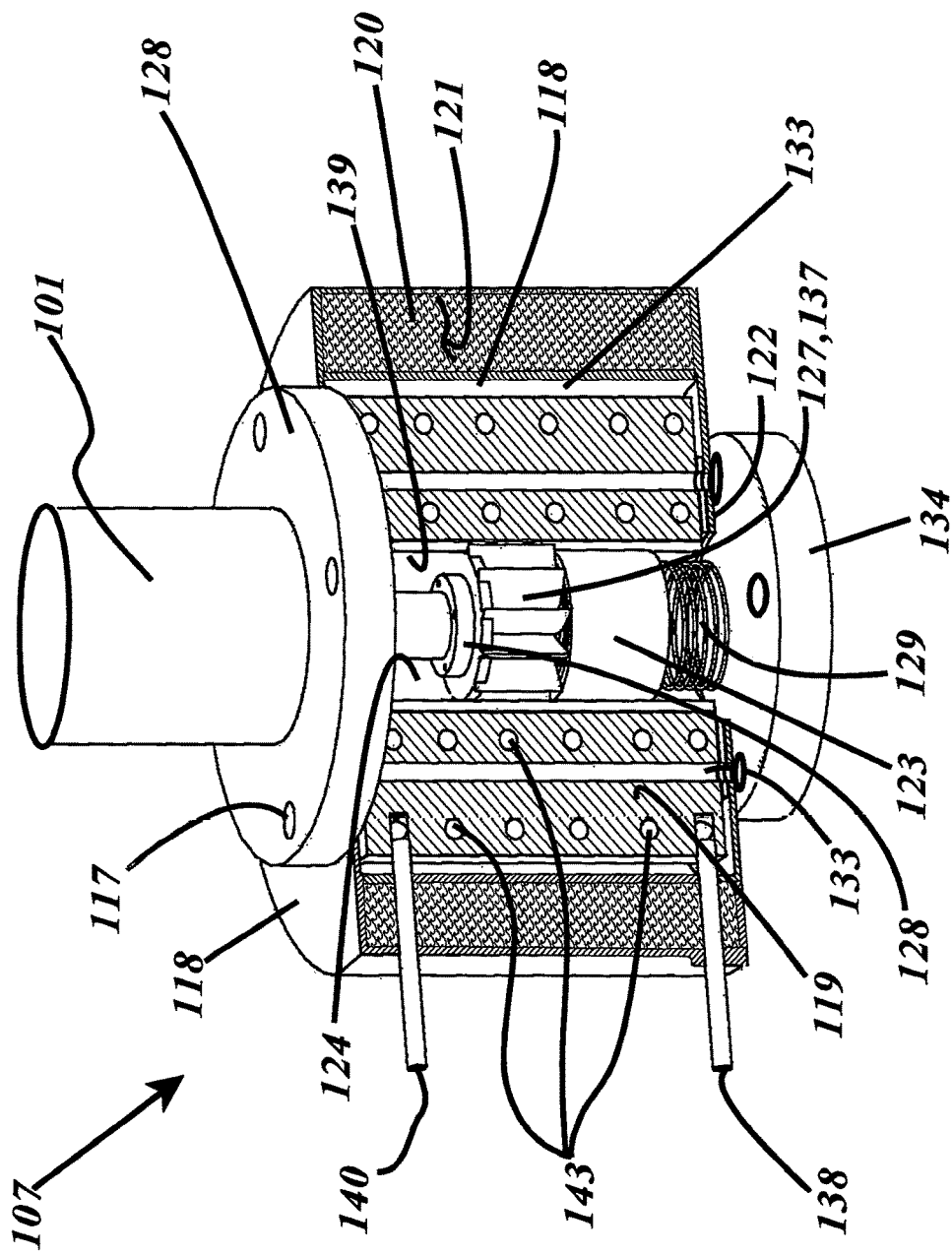
FIG. 16 shows the thermal battery with a dynamic friction vane charging system inside the thermal battery. The thermal mass is shown inside the vacuum case with the thermal mass passageways.
Figure 17:
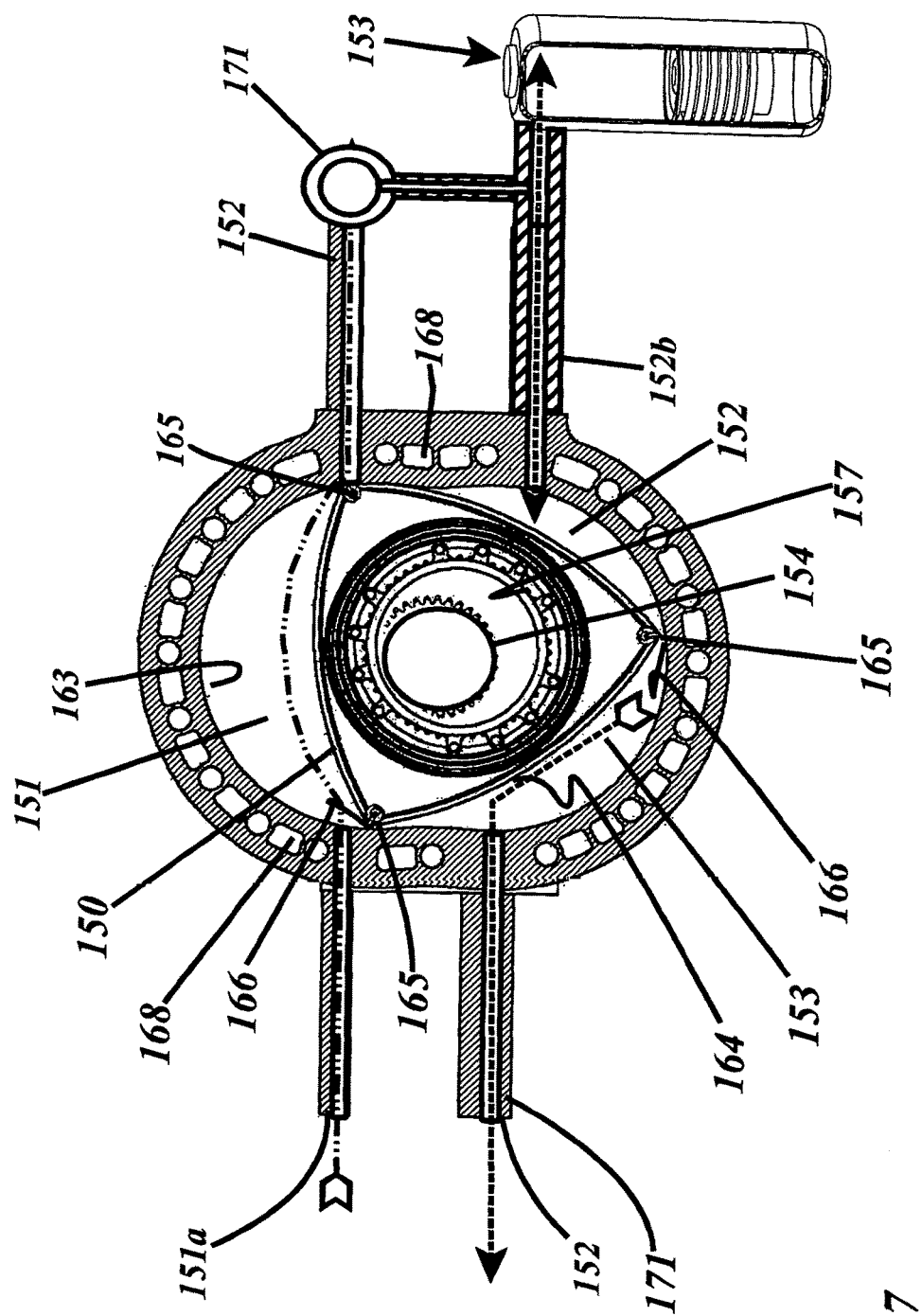
FIG. 17 shows the flow of expansion fluid within the thermal engine with the primary exhaust shown coupled to the main exhaust line, the secondary exhaust port coupled to a pressure oscillator whose vibrations are converted by a diaphragm's movements to electrical energy by an induction coil and a magnet.
Figure 18:
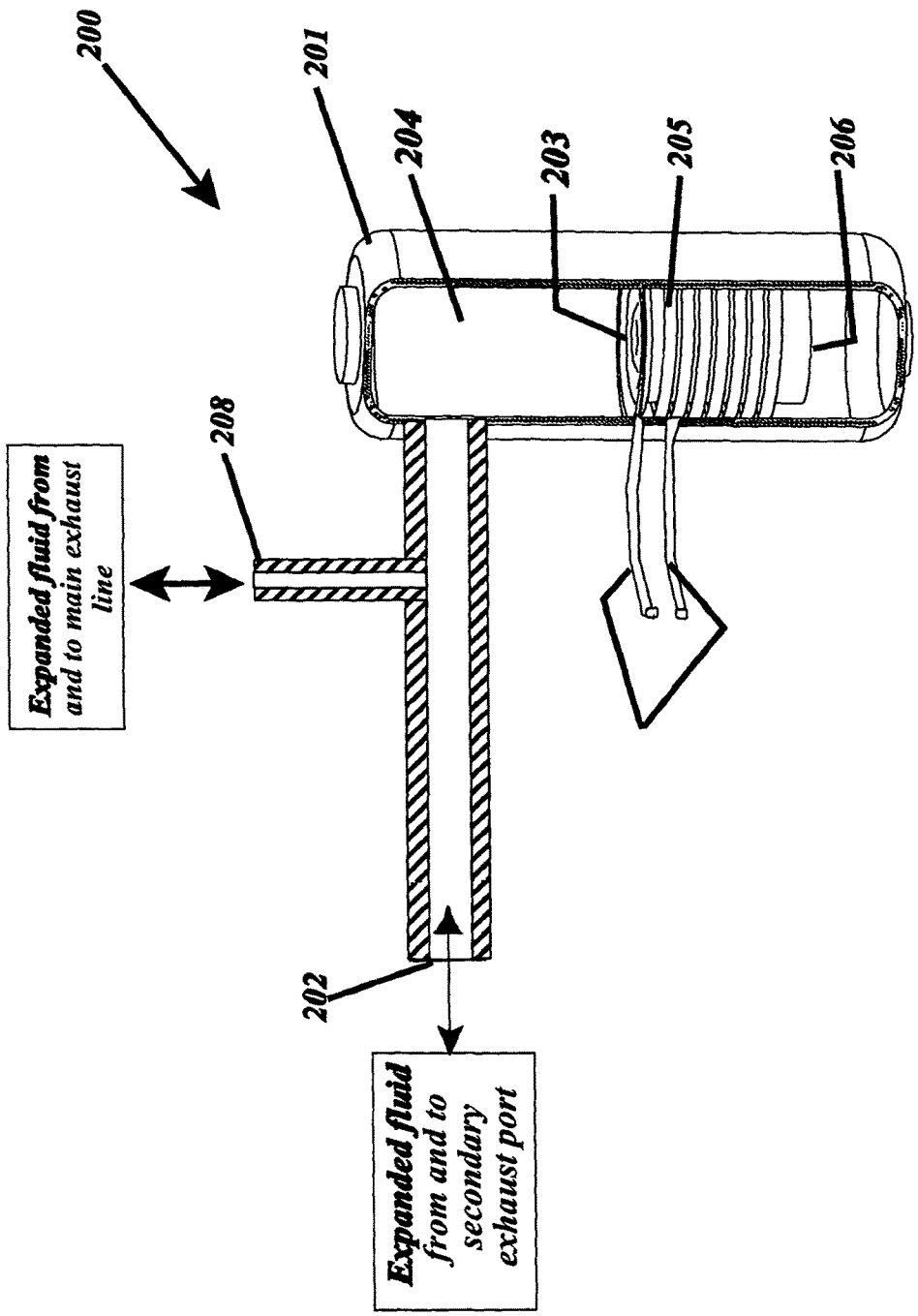
FIG. 18 shows the pressure oscillator with a diaphragm, a magnetic induction coil and a stationary induction coil surrounding a magnet that moves with the movements of the diaphragm to product electrical energy. The figure also shows the flow of expanded fluid to and to and from the main exhaust line and from the secondary exhaust port.

Referring to FIGS. 1-18, a thermal engine assembly is disclosed, a preferred embodiment of which takes the form of a wind turbine assembly 100. More specifically, the present wind turbine assembly 100 charges a thermal battery 107 for powering a thermal engine 108, to in turn power water pumps, refrigerators, and for heating and cooling.

In a first embodiment of the invention, the apparatus includes a thermal battery 107 for storing heat including a thermal mass 119 within a thermal battery 107 vacuum case 118 and a means of charging the thermal battery 107 using wind energy and solar energy. A means of charging the thermal battery 107 with thermal energy stored in the thermal mass 119 is provided including a conventional wind turbine assembly 100 with a solar lens 103 incorporated to generate mechanical energy and solar energy from wind and from sunlight respectively. The wind turbine assembly 100 comprises turbine blades 109 which respond to wind currents by rotating. At the same time, a solar lens 103 incorporated is used to collect solar energy. The rotation of such turbines is generally uncontrolled since it depends on the variable motion of wind. Thus conventional wind turbines have many gears and controls to regulate high speed rotation rates that can occur. The present invention does not need all these complications. The turbine assembly includes a horizontal casing 104. The rotation of the turbine blades 109 is transmitted by a horizontal shaft 102 to drive a vertical shaft 105 directly, without limiting, or controlling the speed. A dynamic friction rod 126 attached to the end of a vertical shaft 105 is used to generate frictional heat against a static friction rod 123. The static friction rod 123 is embedded within a thermal mass 119 of the thermal battery 107 and when the turbine blades 109 rotate, the motion is translated by bevel gear 102a attached to a horizontal shaft 102 to rotate a bevel gear 105a attached to a vertical shaft 105 and then to rotate the dynamic friction rod 126 against a static friction rod 123 to generate frictional heat between said static friction rod 123 and said dynamic friction rod 126. Incorporating a solar lens 103 on top of the vertical casing 101 of the apparatus allows the vertical shaft 105 to act as a thermal mass 119 that transmits the motion to the thermal battery 107 and also transmits solar energy to the thermal mass 119 directly. The thermal energy thus generated is stored in a thermal mass 119 for later use for one of, heating, powering a thermal engine 108 to drive an electrical generator 148, a pump, an evaporative cooling system and for powering a compressor for air-conditioning.

Advantageously, the wind turbine assembly 100 can be of conventional design such as having turbine blades 109 that rotate with the flow of wind currents. However, no electrical generator 148 need be mounted to the wind turbine assembly to capture the mechanical wind energy. Such conventional wind turbines are well known in the industry and any such wind turbine may be used with the present invention to rotate the dynamic friction rod against the static friction rod 123 to generate heat that can be stored in a thermal mass 119.

The horizontal shaft 102 housed in a horizontal casing 104 using horizontal shaft bearings 102b. Turbine blades 109 attached to one end of the horizontal shaft 102 allow the wind currents to rotate the horizontal shaft 102. The motion of the horizontal shaft 102 is coupled to a bevel gear 102g to transmit power to another bevel gear 105g attached to of a vertical shaft top end 130. A vertical casing 101 holds the vertical shaft 105 on vertical shaft bearings 105b to freely rotate. The motion is transmitted from the horizontal shaft 102 to the vertical shaft 105 to drive a dynamic friction rod 126 in intimate mechanical contact with the thermal mass 119 of the thermal battery 107. The relative rotation of the dynamic friction rod 126 against the static friction rod 123 generates heat that is stored in the thermal mass 119. A solar lens 103 on the top of horizontal casing 104 is focuses sunlight on of the vertical shaft top end 130 to transmit solar energy directly to the vertical shaft 105. The heat collected from the solar lens 103 from sunlight is transmitted to the thermal mass 119 by the vertical shaft 105 and the dynamic friction rod 126. The heat stored in the thermal mass 119 can then be used at a later time to generate mechanical power using a thermal engine 108 such as described by the present inventor in U.S. Pat. No. 8,186,160, and U.S. Pat. No. 9,500,158 B1.

In its most basic form, the first embodiment of the invention the apparatus 10 includes a thermal battery 107 comprising a thermal battery vacuum case 118 within which is housed a thermal mass 119. A vacuum cavity 120 between the outer walls of the thermal mass 119 and inner walls of the thermal battery vacuum case 118 holds a vacuum to prevent heat loss from the thermal mass 119. A thermal engine 30 is provided, comprising of an epitrochoid casing 159, within which is a rotor 150 of triangular shape with three rotor edges 166, with groves 164 for apex seals that sealingly ride on the interior smooth surface of the epitrochoid casing 159. The rotor 150 rotatably mounts on a crank lobe 156 offset on the axis of a crankshaft 155 which is held by crankshaft bearings 161 housed in epitrochoid casing covers 159a. The thermal engine 108 is powered by expanded fluid 142 generated from expansion fluid 142 within expansion fluid 142 passageways 143 within the thermal mass 119, A wind turbine assembly 100 comprises of a horizontal casing 104 of substantially cylindrical shape rotatably coupled to a vertical casing 101 of substantially tubular design. A solar lens 103 in the shape of dome sits axially aligned with the axis of the vertical casing 101 to face skyward and collect solar energy. A horizontal shaft 102 is held by bearings 102a in the horizontal casing 104; a vertical shaft 105 is held with bearings 105a in the vertical casing 101. The horizontal shaft 102 has a bevel gear 114a attached to one end to mesh with and drive a bevel gear 114b attached to the vertical shaft top end 130. The other end of the horizontal shaft 102 protrudes through the horizontal case 104 to rigidly hold a symmetric radial array of turbine blades 109.

The vertical shaft 105 further consists of a dynamic friction rod flange 116 welded or mechanically coupled to the bottom end of vertical shaft 105 to attach a dynamic friction rod 126 with bolts. The horizontal casing 104 and the vertical casing 101 are constructed from rigid materials such as aluminum or steel. The horizontal casing 104 mounts rotatably on a journal bearing 131 attached between the vertical casing 105 and the horizontal casing 102 to allow the horizontal casing 102 to rotate and make the turbine blades 109 freely orient to the maximum flow of wind. The vertical casing 101 serves as a support structure for the wind turbine assembly 100. The bottom end of the vertical casing 101 has a vertical casing flange 117 that attaches with bolts to bolt holes 118b on the thermal battery vacuum case 118.

The thermal battery 107 can be constructed as a structural support and foundational base of the apparatus 10. The vertical casing 101 is preferably a double walled tube with reflective internal walls between which a vacuum is maintained to reduce conductive heat losses from within the vertical casing 101. Preferably, the internal walls of the vertical casing 101 are highly reflective to prevent radiation heat loss. Insulation could also be used to fill the gap between the double walls of the vertical casing 101.

In some cases, the rotation of the vertical shaft 105 can be used to directly drive to drive the dynamic friction rod 126 at one end if the thermal battery 107 is axially aligned to the horizontal casing 104. Obviously, the rotation of the horizontal shaft 102 can be translated to a vertical shaft 105 to freely rotate therein when the horizontal shaft 102 rotates. For the purposes of this invention, either a vertical shaft 105 or a direct horizontal shaft 102 can be used to drive a dynamic friction rod 126.

Preferably, the vertical shaft bearings 105b should be able to withstand very high temperatures. These vertical shaft bearings 105b could be made for example from ceramic materials, alumina composites, and from graphite alloys. The vertical shaft 105 should also be made from an excellent thermal conductor such as copper alloys or aluminum alloys. Depending on the maximum operating torque and the operating temperatures of the apparatus 10, the vertical shaft 105 can be made from aluminum or carbon steel. It could also be made hollow and filled with waxes that have good thermal storage capacities. Sunlight is concentrated by solar lens 103 and focused to a focal point 111 on the vertical shaft top end 130 to transmit heat to vertical shaft 105 and thus to the thermal mass 119. The vertical shaft top end 130 may be designed to be parabolic in shape to maximally collect sunlight from the solar lens 103 at any angle. It is important that the surfaces of the vertical shaft 105 be colored black to avoid any reflected sunlight therefrom. The vertical casing flange 117 attaches with bolts to the thermal battery 107 vacuum case 118. A vertical shaft port 132 passes through both horizontals faces of the thermal battery 107 vacuum case 118, with similar bolt holes passing through the thermal mass 119. Thus when assembled, the thermal battery 107 itself can act as a foundation pedestal strong enough to hold the entire apparatus 10. The thermal battery 107 has a thermal battery vacuum case 118 that surrounds a thermal mass 119 and encases the thermal mass 119 in a vacuum. Appropriate insulation such as ceramic fibers, blankets and other materials such as ceramic fire bricks can be used to insulate the thermal battery 107 from heat losses. The thermal battery 107 can act as a structural base to hold the wind turbine assembly 100 in position. The vertical casing 101 should be insulated from the thermal battery 107 by a suitable insulating gasket 136 such as a ceramic gasket. The insulating gasket 136 should be thick enough to prevent heat loss to the vertical casing 101 from the thermal battery 107.

A vertical shaft port through the thermal battery vacuum case 118 has bolt holes similar to bolt holes on the vertical shaft flange 117 and is open enough to accept and allow the dynamic friction rod flange 116 to project into a thermal mass hole 139 inside the thermal mass 119. The thermal mass hole 139 through the thermal mass 119 is center on the axis of vertical shaft 105. Thus when the vertical casing flange 117 is bolted to the thermal battery vacuum case 118 with the insulating gasket 136 in place the vertical shaft 105 projects about midway into the thermal mass hole 139. The vertical shaft 105 should freely rotate within the thermal mass hole 139.

Preferably, both the thermal mass 119 and the thermal battery 107 vacuum case 118 can be constructed from metals such as stainless steel in the form of cylinders or rectangular boxes. The thermal mass 119 is preferably a block of high thermal storage materials such as cast iron, stainless steel or suitable graphite and composite alloys. The shape of the thermal mass 119 should closely match the shape of the thermal battery vacuum case 118 and preferably the two can be cylindrical, spherical or some other suitable shape that minimizes the surface area per unit volume of material. The thermal mass 119 is made from suitable high heat capacity materials is preferably made from alloys of stainless steel, but can also be pure metals such as tungsten, cobalt, and titanium. Graphite may also be used if weight is of concern. The thermal mass 119 has a weight that is calculated to achieve the desired thermal energy storage capacity required and thus must be suitable for the energy generation capacity of the wind turbine.

Examples of the heat storage density of some materials are shown in the table below:

| Material | Heat storage density kJ/m³ ° C. | Operating temperature range, ° C. |
| --- | --- | --- |
| Aluminum | 2484 | 680 |
| Cast Iron, Stainless Steel, | 3889 | 1151 |
| Ceramics | 2800 | 2000 |
| Taconite | 2500 | 2000 |
| Saltstream ™ | 1960 | 565 |

Thus, a material with high thermal storage capacity accords the least volume of the thermal mass 119. The dynamic friction rod flange 116 is designed to bolt to a cylindrical dynamic friction rod 126 to mechanically coupled and make intimate thermal contact with the vertical shaft 105 to maximize heat transmission between the vertical shaft 105 and the dynamic friction rod 126. This constitutes the wind turbine assembly 100.

A cylindrical static friction rod 123 made from materials with high friction capacity is passed through the thermal mass hole 139 to mate intimately with the dynamic friction rod 126. A compression spring 113 is placed behind the static friction rod 123 to push it against the dynamic friction rod 126. It is important that the static friction rod 123 be surrounded by and be in intimate contact with the thermal mass hole 139. The dynamic friction rod 126 can be attached to the dynamic friction rod flange 116 by recessed bolts and countersinking, so that it can be removed and replaced when the need arises. However, it can also be designed with a meshing surface to mate with matching meshing surface on the dynamic friction rod flange 116. A static friction rod retainer plate 134 with matching bolt holes is then bolted to the bottom face open end of the thermal battery vacuum case 118 to lock the assembly in place.

Preferably, the thermal battery 107 is cylindrical shape. However many shapes and forms can be adapted without limiting the invention. The thermal battery vacuum case 118 that surrounds the thermal mass 119 must have a vacuum cavity 120 between the thermal mass 119 and the thermal battery vacuum case 118 to maintain a vacuum around the thermal mass 119. Ceramic spacers could be used to prevent direct contact between the thermal battery vacuum case 118 and the thermal mass 119. The vertical shaft port 132 has bolt holes that should match the vertical casing flange 117 as well as match the thermal battery bolt holes 107a. To maintain vacuum, a vacuum insulating gasket 122 made from a suitable insulator such as ceramic is provided to seal the periphery of the thermal mass hole 139. The vacuum insulating gasket 122 is placed between the thermal battery vacuum case 118 and the thermal mass 119 to seal the thermal mass hole 139 and prevent vacuum loss and heat loss from the vacuum cavity 120.

The static friction rod retainer plate 134 is bolted to the static friction rod 123 and to the thermal battery vacuum case 118 to fixate it from rotating relative to the thermal mass 119. The static friction rod 123 has an area that is large enough for the dynamic friction rod 126 to freely rotate against its end to allow thermal transmission fluids such as mixtures of ferrous materials and silicon to fill the empty spaces inside the thermal mass hole 139.

The focused sunlight 111 can heat up the vertical shaft 105 to transmit heat to the thermal mass 119. Thus the static friction rod 123 should be in intimate thermal contact with the thermal mass hole 139 and should be able to transmit heat efficiently to the thermal mass 119. The dynamic friction rod 126 rotates against the static friction rod 123 to thermally heat up the thermal mass 119 by friction. As such the static friction rod 123 should be made from a suitable material such as wollastonite (calcium silicate), copper alloys, stainless steel alloys, abrasives, asbestos, vermiculite (hydrated calcium aluminum silicate), mica (aluminum silicate), basalt fiber, rockwool, (blast furnace slag or basalt), Fiberfrax@ ceramic fiber, polyacrylonitrile (PAN), polyester, chopped glass fiber, and aramid fibers. The static friction rod 123 is compressed against the dynamic friction rod 126 to make intimate contact using the compression spring 113. Thus when the vertical shaft 105 rotates, heat is generated and stored in the thermal mass 119. The static friction rod retainer plate 134 makes for easy removal of the static friction rod 123 and the dynamic friction rod 126 for maintenance.

The dynamic friction rod 126 can be made as a series of springy dynamic friction vanes 137 that directly slide frictionally against the thermal mass hole 139. This allows dissipation of friction heat from the dynamic friction vanes 137 directly into the thermal mass 119 without a need for the static friction rod 123. A copper heat dissipation and wear sleeve 139a could be incorporated to tightly fit inside the thermal mass hole 139 to avoid wear of the thermal mass hole 139. The apparatus can store heat from wind or solar energy.

Advantageously, as the dynamic friction rod 126 rotates against the static friction rod 123, heat is generated between them and transmitted through the static friction rod 123 to within the thermal mass 119. It is important that the static friction rod be made from a highly conductive and friction generating material as mentioned earlier. Stainless steel, copper and titanium alloys may also be used for low power application since a continuous low power charging of the thermal mass 119 can still occur over time. In some cases, a Ferro-silicon and sand filled fluids can be used to fill up empty spaces in the thermal mass hole 139 to generate additional frictional heat by rotating dynamic friction rod therein and to absorb the heat from the solar rays 111 that has been transmitted to and through the vertical shaft 105. Sand, salts and other alumina silicates mixed with some thermal waxes may also be used to fill the free spaces in the thermal mass hole 139 to generate as much added friction as possible and heat distribution as possible.

Advantageously, the vertical shaft 105 itself acts to increase the amount of thermal mass 119 to increase the heat storage capacity of the thermal battery 107.

An expansion fluid 142 intake pipe 140 is provided to sealingly enter into the thermal mass 119 through the thermal battery vacuum case 118. An expansion fluid 142 intake valve 141 connects to the expansion fluid intake pipe 140 to control the amount of expansion fluid 142 that enters the thermal battery 107. A source of an expansion fluid 142 preferably water from a suitable mains supply can be used to supply expansion fluid 142 to the expansion fluid intake valve 141. The expansion fluid intake pipe 140 connects sealingly to expansion fluid passageways 143 interspersed throughout the thermal mass 119 for adequate removal of heat from all regions of the thermal mass 119. Preferably the thermal mass 119 is a cast block of metal that has the expansion fluid passageways 143 built-in. This can be achieved by means of overcasting metal on pipes of similar materials that form the expansion fluid passageways 143. The expansion fluid passageways 143 are designed to bring in expansion fluid 142 through the walls of the thermal battery 107 and fluidly and sealingly circulate expansion fluid 142 through the thermal mass 119 to create a thermodynamic phase change of the expansion fluid 142 and generate a gas as an expanded fluid 144 therefrom. The expanded fluid output 149 also sealingly passes through the thermal vacuum case 118 to exit therefrom and bring expanded fluid to the outside of the thermal battery 107. The first method of operation and use of the apparatus 10 is as follows. When wind impinges on the turbine blades 109, the horizontal shaft 102 rotates. The motion is transmitted to the bevel gear 102g attached the horizontal shaft 102 and causes the bevel gear 105g attached to the vertical shaft 105 to rotates it. The vertical shaft 105 rotates and transmits the motion to the dynamic friction rod 126. The friction between the dynamic friction rod 126, and the static friction rod 123 results in heat energy being generated. The heat energy is transmitted to the thermal mass 119 and stored therein as its temperature rises. Further, and additionally, focused sunlight is transmitted to the focal spot 111 on the vertical shaft end 130 which becomes heated. The heat is stored in the thermal mass 119. When the thermal energy is needed for regeneration, the expansion fluid intake valve 141 is opened, expansion fluid 142 passes through the thermal mass 119, and heats up rapidly. Hot expansion fluid 142 is expanded to expanded fluid 144 and generates a pressure. The expanded fluid 144 is used for heating and to power non mechanical devices in a home 179 such as either an absorption refrigerator 145 or to heat a home radiator 180 for heating, not to mention many other uses such hot water for homes and industry.

As a further element of the invention, a thermal engine 108 powered by expanded fluid 144 from the thermal batteries 107 is provided. The thermal engine 108 combined with the turbine assembly 100 and thermal battery 107 mentioned above are necessary to generate electrical energy and for pumping water if needed. The thermal engine 108 includes an epitrochoid casing 159 within which a rotor 150 is slidably and sealingly contained to form three distinct rotating variable volume chambers between the epitrochoid casing covers 159a, the three rotor faces, rotor face 150a, rotor face 150b, and rotor face 150c and with the epitrochoid casing inner wall 159b. The rotor 150 is triangular in shape similar to a conventional Wankel engine but differs by not having a compression chamber, or spark plugs. The thermal engine 108 uses a crank lobe 156 with a crank shaft bearing 169 eccentrically offset from the crankshaft 155's axis. It also has four distinct fluid ports. An internal sun gear 115 is rigidly attached to a large bore through the rotor 150's central axis of symmetry to cause motion of the rotor 150 to follow a crankshaft 155 with a crank lobe 156 that holds a planet gear 158. The crank lobe 156 passes through the center of the planet gear 158 and rotates on a crank shaft journal 162.

The epitrochoid casing 159 has cooling passages 168 around its peripheral wall to allow for cooling fluids to pass through, to cool the thermal engine 108. The epitrochoid casing covers 159c are provided with engine seals 160 and crank shaft bearings 155b, through which the crank shaft 155 rotates freely. The crank shaft has a drive shaft 155d for powering devices. Several assemblies of the above assembly can be stacked together with a multi-lobed crankshaft to form a multi-rotor thermal engine 108.

The epitrochoid casing covers 159c, rotor face 150a, rotor face 150b, and rotor face 150c and the epitrochoid casing inner wall 159w have generally smooth and continuous surfaces with no sharp edges. The rotor 150 is preferably triangular in shape with rotor face 150a, rotor face 150b, and rotor face 150c forming a profile on the intersection of three large cylindrical faces with centers at the points of a triangle that is typically 4-5 times the size of the rotor 150 peripheral circle. Similar to a conventional rotary engine, the rotor 150 has rotor edges 166 each with a rotor edge groove 164 designed to hold apex seals 165. The apex seals 165 are generally made from steel but can also be made from a suitable ceramic or rubber material. The apex seals 165 form a fluid seal between the rotor edges 166 and the epitrochoid casing inner wall 159w so that at any one time only three chambers comprising of an intake chamber and a primary exhaust chamber and secondary exhaust chamber are formed. The rotor 150 is smaller than the epitrochoid casing 159 and can ride around inside of it. At one time during its motion, the three apex seals 165 and the rotor edge seals 166, and the epitrochoid casing covers 159c will form the three closed chambers. As the rotor 150 rotates around the epitrochoid casing inner wall 159w, the contact points form variable chambers in fluid communication at all times with an intake port 170, a primary exhaust port 152, a secondary exhaust port 153, and a tertiary exhaust port 154.

In reference to the epitrochoid casing 159, when the center point of the crank lobe 156 lines up with longest axis of the epitrochoid casing 159, the crank lobe 156 will be considered to be at the 0° angular position of the crankshaft 155. The thermal engine 108 further consists of one intake port 170 positioned approximately at 315° angle from the 0° angular position. The crank lobe 156 is considered to be at "Intake dead center" when aligned with an intake port 170 at 315° from the 0° angular position of the crankshaft 155. The thermal engine 108 has a primary exhaust port 152 at approximately 45° angle from the 0° angular position of the crankshaft 155. A secondary exhaust port 153 is positioned at 90° from the 0° angular position of the crankshaft 155, and a tertiary exhaust port 154 is positioned at 215° angle from the 0° angular position of the crankshaft 155. Thus at any moment, there are always three active chambers and four ports on the thermal engine 108.

The intake port 170 is offset from the tertiary exhaust port 154 by about 90° counter clockwise from the 0o angular position of the crankshaft. Other angular offsets may be used between the ports to optimize the flow of expanded fluid 144 through the thermal engine 108. The epitrochoid casing 159 has bolt holes for bolting epitrochoid casing covers 159c to form a closed thermal engine 108 with sealed chambers.

To operate the apparatus 10, either electric power, wind power or solar power may be used to charge the thermal battery 107 with heat. However, in the preferred embodiment of the invention, wind energy is used to rotate the horizontal shaft 102 to generate frictional heat from the rotational friction between a static friction rod 123 and a dynamic friction rod 126. This heat is stored within the thermal mass 119 as explained earlier. A solar lens 103 also heats up the vertical shaft 105 to transmit heat to the thermal mass 119 through the vertical shaft 105. The thermal mass 119 heats up to temperatures that far exceeds the boiling temperature of the expansion fluid 142 so that expanded fluid 144 can be obtained therefrom. To regenerate the thermal energy and use it to generate heating, mechanical or electric power, the expansion fluid intake valve 141 is opened. Expansion fluid 142 passes through the expansion fluid passageways 143 and expands by phase change to expanded fluid 144 such as steam. The amount of expanded fluid 144 generated and thus its temperature depends on the final thermal temperature and thermal characteristics of the thermal mass 119. Pressure generated by the thermal mass 119 can be regulated by controlling the flow rate of expansion fluid 142 using an expansion fluid intake valve 141 such as a needle valve. The expansion fluid 142 such as water is passed through the expansion fluid passageways 143 to circulate within the thermal mass 119 to uniformly heat and expand from a liquid phase to an expanded fluid 144 in the vapor form. Thus the expanded fluid 144 such as steam can be passed into the thermal engine intake port 170 to generate mechanical power. The expansion of most expanded fluid 144 such as steam for example, cannot completely occur during the intake expansion phase.

When expanded fluid 144 enters the thermal engine intake port 170, it expands and causes the rotor 150 to rotate. Advantageously, there are three exhaust ports, a primary exhaust port 152 at approximately 45° angle from the 0° angular position of the crankshaft 155, a secondary exhaust port 153 positioned at 90° from the 0° angular position of the crankshaft 155, and a tertiary exhaust port 154 is positioned at 215° angle from the 0° angular position of the crankshaft 155. All the exhaust ports are fluidly coupled together to a main exhaust line 171. The rotor 150 rotates clockwise an increasing angular orientation from the vertical axis of the epitrochoid casing 159. During a single cycle of the rotor 150, an active chamber is formed by isolating the intake port 170 from all the other ports with two apex seals. For the purposes of clarity, the two particular apex seals that have a common face on the rotor 150 to isolate the intake port 170 will form an isolated present active chamber $A_1$. The rotation of the two seals takes the present active chamber $A_1$ through a cycle of the engine. There are thus three active chambers in a clockwise sequence, a present active chamber $A_1$, a past active chamber $A_2$ and a future active chamber $A_3$ that are in sequential rotation around the epitrochoid casing 159.

At the start of a cycle, the thermal engine intake port 170 is fluidly isolated from the primary exhaust port 152, from the secondary exhaust port 153 and from the tertiary exhaust port 154 by the two apex seals forming the present active chamber $A_1$. We will start with the present active chamber $A_1$ as it rotates around.

The intake port 170 is never in fluid communication with the primary exhaust port 152 or the secondary exhaust port 153. When present active chamber $A_1$ isolates the intake port 170, the intake port 170 has expanded fluid pressure from the thermal mass 119. The future active chamber $A_3$ is in fluid communication with only the tertiary exhaust port 154. The past active chamber $A_2$ is in fluid communication with both the primary exhaust port 152 and the secondary exhaust port 153.

The pressure in the present active chamber $A_1$ causes the rotor 150 to rotate in a clockwise manner causing the past active chamber $A_2$ and the future active chamber $A_3$ to also rotate. Following the present active chamber $A_1$, it maximizes in volume, rotates the rotor 150, closes fluid communication from the intake port 170 and opens fluid communication with the primary exhaust port 154 to contract and exhaust expanded fluid 144 through the primary exhaust port 154. The primary exhaust port 154 is momentary isolated by the present active chamber $A_1$. As the present active chamber $A_1$ minimizes, (the typical compression stroke of a Wankel engine), the secondary exhaust port 153 comes in fluid communication with the present active chamber $A_1$ while still fluidly connected to the primary exhaust port 152. Thus the secondary exhaust port 153 opens and assists the primary exhaust port 152 in the removal of expanded fluid 144 from the present active chamber $A_1$. While the present active chamber $A_1$ is minimizing both the primary exhaust port 152, and the secondary exhaust port 153 have positive flow of expanded flow into the main exhaust line 171. When the present active chamber $A_1$ passes past the primary exhaust port 152, the secondary exhaust port 153 will still remove expanded fluid 144 from the present active chamber $A_1$. At the minimum volumetric state, the present active chamber has a negative flow through the secondary exhaust port 153 pulling expanded fluid 144 from the main exhaust line 171 back into the present active chamber $A_1$. At some point, the present active chamber $A_1$ cuts-off fluid communication with the secondary exhaust port 153 and only has fluid communication with the secondary exhaust port 153 and establishes fluid communication with only the tertiary exhaust chamber 154. Thus the present active chamber $A_1$ minimizes in volume by expelling expanded fluid 144 to the main exhaust line 171 through only the tertiary exhaust port 154.

As the present active chamber $A_1$ further minimizes in volume and rotates, it comes into fluid communication with both the intake port 170 while still in fluid communication with the tertiary exhaust port 154. The extra pressure from expanded fluid 144 is generated in the main exhaust line 171 from the intake port 170 flow through the tertiary exhaust port 154 into the main exhaust line 171. However as the present active chamber $A_1$ minimizes, the future active chamber $A_3$ has now entered into fluid communication with the secondary exhaust port 153 which also has rotated with the present active chamber $A_1$ in tandem. The extra pressure must now be annihilated by removing expanded fluid 144 from the main exhaust line 171 to reenter through the secondary exhaust port 153 into a future active chamber $A_3$ while it is in a negative pressure state. Thus when the present active chamber $A_1$ is minimizing through the tertiary exhaust port 154, the future active chamber $A_3$ is maximizing in fluid communication with the secondary exhaust port 153. The future active chamber $A_3$ now pulls exhausted expanded fluid 144 through the secondary exhaust port 153 from the main exhaust line 171 that is exactly equal to the amount being taken into the present active chamber $A_1$ from the intake port 170 into the present active chamber $A_1$.

The present intake chamber $A_1$ rotates and cuts off the tertiary exhaust port 154 and enters into fluid communication with only the intake port 170 to start a new cycle isolating the intake port 170 to form a new present active chamber $A_1$.

Note that while the present active chamber $A_1$ forms a new intake chamber to restart the cycle, the future active chamber $A_3$ is in communication with the tertiary exhaust port 154, as a new future active chamber replacing the present active chamber's prior position and the past active chamber $A_2$ is in fluid communication with the primary exhaust port 152 and the secondary exhaust port 153.

A pressure wave is generated by the flow of expanded fluids to and from the secondary exhaust port 153 forming an acoustic wave. These pressure variations of the main exhaust line and the secondary exhaust port 153 of such pressure cycles can be regulated by adding a pressure oscillator 200 with a diaphragm 203 held in a sealed pressure oscillator casing 201 to accommodate the pressure cycles. Thus such a pressure oscillator 200 can act to oscillate an induction coil 205 around a stationary magnet 206 to generate electricity by induction. Similarly such a pressure oscillator 200 can act to oscillate a diaphragm 203 in a sealed pressure oscillator casing 201 to force water in and out of the pressure oscillator 200 and through a one way valve for example to act as a diaphragm pump. The pressure oscillator 200 should be in fluid communication with the secondary exhaust port 153 and to some extent to the main exhaust line 171 to absorb and dispose of positive and negative pressure oscillations of the expanded fluid 144 through the second exhaust port 153. The pressure oscillator 200 will absorb and release pressure from the secondary exhaust port 153 in a periodic manner forming pressure waves or a resonant acoustic waves. Advantageously if the acoustic waves are properly timed to generate a resonance, the pressure oscillator 200 will become a resonator that amplifies the pressure cycle to maximize the pressure of the intake port 170 and minimize the pressure of the main exhaust line 171 thus smoothing out and increasing the power of the thermal engine 108 during operation.

Advantageously, the intake port 170 and the exhaust ports should be shaped as slits with appropriate area to minimize the time during which the apex seals pass over them. The primary exhaust port can be in unimpeded fluid communication with the main exhaust line 171 using a substantially large pipe section to freely carry expanded fluid 144 without hindrance. The secondary exhaust port 153 should in fluid communication with both the pressure oscillator 200 and the main exhaust line 171 to resonate. If the timing is carried out properly, the reciprocal flow of expanded fluid 144 to and from the pressure oscillator and into and out of the secondary exhaust port 153 could resonate with the intermittent supply of expanded fluid 144 from the intake port 170 and the removal of expanded fluid from the main exhaust line. A multiple compounded oscillatory flow of expanded fluid 144 from the main exhaust line 171 could cause pressurization at the secondary exhaust port 153 and phase shift the vacuum phase at the secondary exhaust port 153 to the main exhaust line to generate more rotational energy from the rotor 150.

The tertiary exhaust port 154 should be in unimpeded fluid communication with the main exhaust line 171. The main exhaust line 171 could be open to atmosphere, but may also be coupled fluidly to a radiator 180 for heating. The exhausted expanded fluid 144 can be recycled by providing a radiator 180 through which expanded fluid 144 can flow from the main exhaust line 171 to cool to condense into hot expansion fluid 142 that can be reused or used for home or industrial heating purposes. If water is used as expansion fluid 142, the water can be supplied to the cool the thermal engine 108. An absorption evaporative cooler 190 may also be provided. It uses a heat source such as waste factory heat, solar heat, and fueled flames to provide the energy needed to drive a cooling process. The absorption cooling cycle comprises an evaporation phase, an absorption phase and a regeneration phase. A liquid refrigerant is evaporated in a low partial pressure environment to extract heat from its surroundings. The low partial pressure results in a low temperature of evaporation of the refrigerant. The refrigerant is absorbed by another liquid such as water with a salt preferably an ammonium salt, dissolved therein. When the resulting refrigerant in solution is heated by expanded fluid 144 from the thermal mass 119, refrigerant-saturated liquid is heated and the refrigerant evaporates out of solution. A radiator 180 cools the gaseous refrigerant to remove the heat to ambient air which can be used for heating a home 179. This condenses the refrigerant to start the cycle again.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A thermal engine assembly, comprising:
    a wind turbine having a turbine shaft and airfoil blades extending radially from said turbine shaft;
    a dynamic friction rod drivably connected to said turbine shaft;
    an assembly base;
    a static friction rod secured to said assembly base and positioned to be in abutment with said dynamic friction rod, such that rotation of said turbine shaft rotates said dynamic friction rod relative to said static friction rod and causes friction which generates heat;
    a thermal battery containing a thermal mass in thermal communication with one of said dynamic friction rod and said static friction rod and a fluid passageway containing a phase change fluid in thermal communication with said thermal mass, such that heat generated by relative motion between said dynamic friction rod and said static friction rod flows into said thermal mass and from said thermal mass flows into said phase change fluid;
    a thermal engine comprising an expansion chamber and drive member;
    and a fluid conduit connecting said fluid passageway to said thermal engine;

wherein heat received from said thermal mass causes said phase change fluid to change from a liquid phase to a gaseous phase, increasing fluid pressure within said expansion chamber and thereby displacing said drive member.

2. The thermal engine assembly of claim 1, additionally comprising a supply valve in said fluid conduit controlling the flow of phase change fluid through said fluid conduit from said thermal mass to said thermal engine.

3. The thermal engine assembly of claim 1, additionally comprising drive transmission mechanism drivably connecting said turbine shaft to said dynamic friction drive plate.

4. The thermal engine assembly of claim 3, wherein said drive transmission mechanism comprises turbine shaft bevel gear secured to said turbine shaft and a drive transmission shaft drivably connected to said dynamic friction plate and having a transmission shaft bevel gear drivably connected to said turbine shaft bevel gear.

5. The thermal engine assembly of claim 4, additionally comprising a drive shaft casing surrounding said drive transmission shaft.

6. The thermal engine assembly of claim 1, additionally comprising a solar lens for orienting toward the sun and in thermal communication with said thermal mass, such that heat radiated from the sun is gathered by said solar lens and transmitted into said thermal mass.

7. The thermal engine assembly of claim 6, wherein said drive shaft casing contains at least one reflection surface for reflecting solar radiation from said solar lens to said thermal mass to heat said thermal mass.

8. The thermal engine assembly of claim 1, wherein said thermal mass is enclosed in a vacuum case having a case wall and having a vacuum case interior larger than said thermal mass, and said thermal mass is positioned within said vacuum case interior such that an insulating space between said thermal mass and said case wall surrounds said thermal mass to thermally isolate said thermal mass and thereby minimize unproductive heat loss.

9. The thermal engine assembly of claim 1, additionally comprising a radiator for radiating heat within the interior of a building.

10. The thermal engine assembly of claim 9, additionally comprising an evaporative cooler.

11. The thermal engine assembly of claim 10, additionally comprising a radiator for radiating heat within the interior of a building.

12. The thermal engine assembly of claim 11, additionally comprising an evaporative cooler.

13. A wind turbine, comprising:
a turbine shaft and at least one airfoil blade extending radially from said turbine shaft;
a dynamic friction structure drivably connected to said turbine shaft;
a static friction structure positioned to be in abutting relation with said dynamic friction structure, such that rotation of said turbine shaft rotates said dynamic friction structure relative to said static friction structure and causes friction which generates heat;
and a thermal battery containing a thermal mass in thermal communication with one of said dynamic friction structure and said static friction structure and a fluid passageway containing a phase change fluid in thermal communication with said thermal mass, such that heat generated by relative motion between said dynamic friction structure and said static friction structure flows into said thermal mass and from said thermal mass flows into said phase change fluid;
wherein heat received from said thermal mass causes said phase change fluid to change from a liquid phase to a gaseous phase, producing gaseous phase change fluid with increased pressure.

14. The wind turbine of claim 13, additionally comprising an assembly base, wherein said static friction structure is secured to said assembly base.

15. The wind turbine of claim 13, additionally comprising a thermal engine comprising a drive member, and an expansion chamber in fluid communication with said thermal battery, such that the phase change fluid in its gaseous phase from said thermal battery enters and increases pressure within said expansion chamber and thereby displaces said drive member.

16. The wind turbine of claim 15, additionally comprising a fluid conduit connecting said fluid passageway to said thermal engine.

17. The wind turbine of claim 15, wherein said thermal engine comprises an epitrochoid thermal engine casing slidably and sealingly retaining a rotor to form three rotating variable volume chambers between said thermal engine casing and said rotor.

18. The wind turbine of claim 17, wherein said three rotating variable volume chambers comprise an intake chamber, a primary exhaust chamber and a secondary exhaust chamber.

19. The wind turbine of claim 13, wherein said phase change fluid is water and said gaseous phase is steam.

20. The wind turbine of claim 13, wherein said dynamic friction structure is a dynamic friction rod and said static friction structure is a static friction rod.

21. The wind turbine of claim 13, comprising a plurality of airfoil blades extending from said turbine shaft.

22. The wind turbine of claim 13, wherein said thermal battery comprises at least one expansion fluid passageway.

23. The wind turbine of claim 22, wherein said thermal mass comprises a block of metal.

24. The wind turbine of claim 13, additionally comprising a vacuum case surrounding said thermal mass.

25. The wind turbine of claim 24, wherein said thermal battery comprises at least one expansion fluid passageway, and wherein said wind turbine additionally comprises an expansion fluid intake pipe extending from an expansion fluid source and passing through said vacuum case and connected to said at least one expansion fluid passageway in said thermal mass, and an expansion fluid intake valve connected to and in fluid communication with said expansion fluid intake pipe and said at least one expansion fluid passageway for controlling the amount of expansion fluid entering said thermal battery.

26. The thermal engine assembly of claim 13, additionally comprising drive transmission shaft drivably connecting said turbine shaft to said dynamic friction structure, and wherein said thermal mass comprises said drive transmission shaft.

* * * * *